United States Patent

[11] 3,629,837

[72] Inventors James A. Fraunfelder North Wales; Frank C. Getz, Jr., Upper Providence; Sidney L. Kauffman, Jr., Swarthmore; William H. Kurlans, Media, all of Pa.

[21] Appl. No. 7,373

[22] Filed Feb. 2, 1970

[45] Patented Dec. 21, 1971

[73] Assignee Gulf & Western Systems Company New York, N.Y.

Continuation of application Ser. No. 654,649, July 19, 1967, now abandoned. This application Feb. 2, 1970, Ser. No. 7,373

[54] CODED SIGNAL COMMUNICATION SYSTEM
21 Claims, 15 Drawing Figs.

[52] U.S. Cl. .......... 340/171, 340/224, 331/177

[51] Int. Cl. .......... H04q 11/02

[50] Field of Search .......... 340/224, 171; 331/177

[56] References Cited

UNITED STATES PATENTS

| | | | |
|---|---|---|---|
| 2,979,706 | 4/1961 | Simon et al. | 340/224 |
| 3,227,968 | 1/1966 | Brounley | 331/177 X |

*Primary Examiner*—John W. Caldwell
*Assistant Examiner*—Michael Slobasky
*Attorney*—Meyer, Tilberry and Body ABSTRACT: A communication system is disclosed herein which includes a plurality of transmitters, each operative to transmit at least one transmitter address frequency pulse and a message frequency pulse, wherein each frequency pulse is of a frequency selected from one of 10 different frequencies of respectively increasing decimal weight representative of decimal numbers 0 through 9. A receiver serves to decode the frequency pulses and provide a decimal readout indication thereof, as by a visual decimal readout, so that both the message and transmitter address may be displayed.

INVENTORS
JAMES A. FRAUNFELDER,
FRANK C. GETZ, JR.,
SIDNEY L. KAUFFMAN &
BY WILLIAM H. KURLANS

Meyer, Tilberry & Body
ATTORNEYS

INVENTORS
JAMES A. FRAUNFELDER,
FRANK C. GETZ, JR.,
SIDNEY L. KAUFFMAN &
BY WILLIAM H. KURLANS

Meyer, Tilberry & Body
ATTORNEYS

INVENTORS
JAMES A. FRAUNFELDER,
FRANK C. GETZ, JR.,
SIDNEY L. KAUFFMAN &
BY WILLIAM H. KURLANS
Meyer, Tilberry & Body
ATTORNEYS INVENTORS
JAMES A. FRAUNFELDER,
FRANK C. GETZ, JR.,
SIDNEY L. KAUFFMAN &
BY WILLIAM H. KURLANS
*Meyer, Tilberry & Body*
ATTORNEYS INVENTORS.
JAMES A. FRAUNFELDER, FRANK C. GETZ, JR.,
SIDNEY L. KAUFFMAN & WILLIAM H. KURLANS
BY
Meyer, Tilberry & Body
ATTORNEYS INVENTORS
JAMES A. FRAUNFELDER,
FRANK C. GETZ, JR.,
SIDNEY L. KAUFFMAN &
BY WILLIAM H. KURLANS
*Meyer, Tilberry & Body*
ATTORNEYS INVENTORS
JAMES A. FRAUNFELDER,
FRANK C. GETZ, JR.,
SIDNEY L. KAUFFMAN &
BY WILLIAM H. KURLANS

*Meyer, Tilberry & Body*
ATTORNEYS

INVENTORS.
JAMES A. FRAUNFELDER, FRANK C. GETZ, JR.,
SIDNEY L. KAUFFMAN & WILLIAM H. KURLANS
BY
*Meyer, Tilberry & Body*
ATTORNEYS INVENTORS.
JAMES A. FRAUNFELDER,
FRANK C. GETZ, JR.,
SIDNEY L. KAUFFMAN &
BY WILLIAM H. KURLANS
Meyer, Tilberry & Body
ATTORNEYS INVENTORS
JAMES A. FRAUNFELDER,
FRANK C. GETZ, JR.,
SIDNEY L. KAUFFMAN &
BY WILLIAM H. KURLANS
Meyer, Tilberry & Body
ATTORNEYS INVENTORS
JAMES A. FRAUNFELDER,
FRANK C. GETZ, JR.,
SIDNEY L. KAUFFMAN &
BY WILLIAM H. KURLANS Meyer, Tilberry & Body
ATTORNEYS

CODED SIGNAL COMMUNICATION SYSTEM

This case is a continuation of our parent application, Ser. No. 654,649, filed July 19, 1967 for Coded Signal Communication System now abandoned.

This invention is directed toward the art of communications and, more particularly, to transmission and reception of coded frequency signals.

The invention is particularly applicable as a radio emergency signaling system for reporting highway emergencies, fire alarms, and the like, and will be described with particular reference thereto, although it is to be appreciated that the system may be used in many applications requiring transmission and reception of coded frequency message and address signals.

At present, there is a need for a highway emergency radio system so that a vehicle operator, in need of assistance, may signal a control and provide the control station with information as to the address of the operator as well as the type of assistance required, such as police, ambulance, tow truck, et cetera. In such a system, a plurality of transmitters may be located at selected points alongside a highway. In the present invention it is proposed that if a vehicle operator requires assistance, such as a tow truck, police, ambulance, et cetera, he merely actuates one of a number of pushbuttons or the like, respectively representative of these various functions. A coded signal is then transmitted to the central station where the information is decoded and presented on a suitable readout. This readout should provide the operator at the central station with information as to the address of the calling transmitter together with the function desired, i.e., whether the caller requires an ambulance, police, et cetera.

Radio emergency systems known heretofore have employed binary or tertiary codes. A binary code incorporates two states; to wit, "on" or "off," whereas a tertiary system employs three states; to wit, "on," "off," and "negative on" or "-parity." For radio transmission two frequencies are used, one each for on and off, and in the tertiary system a third frequency is used to represent negative on or parity. The transmission of binary or tertiary codes takes place at a relatively slow rate since one bit per pulse is transmitted corresponding to a telegraph code, or switching on and off. Further, the binary and tertiary codes are incompatible with the decimal information being transmitted and the readout desired. Conversion means must be provided in the transmitter for converting decimal information into binary information prior to the transmission of the information to the receiver. Similarly, the receiver must provide binary-to-decimal conversion in order to provide a decimal readout. Also, as is well known, a binary system requires four stages having decimal weights of 8, 4, 2 and 1, the sum of the binary content thereof being representative of a decimal number. Accordingly, transmission of binary coded information requires that more information be transmitted than that for a decimal code for each digit of a decimal number. The associated equipment for a binary coded radio transmitter is more complicated and expensive than a decimal coded transmitter since a greater number of pulses must be sequenced for transmitting the same amount of information.

It is important that the transmission spaced for transmitting coded signals be as fast as possible, since a slow communication transmission time is obviously not desirable for transmitting emergency information. Further, a system incorporating slow transmission speed requires the associated receiving and readout equipment to be complementary in speed to that of the transmission equipment, adding further delays to reporting emergency information. The problems of radio interference is increased when slow transmission speeds are used. This follows since during a prolonged transmission period interference may result from other transmitters in the system attempting to report emergency conditions, as well as the interference that may result from the ever increasing use of the radio spectrum. Also, if a slow transmission speed is used, the power drain to provide power for the transmitter may become an important consideration since slow transmission speeds may lower battery life and increase the cost per message transmitted.

The present invention is directed toward transmitters and receivers particularly applicable for use as a highway emergency radio system, and the like, although the invention is not limited thereto, and which employs a 10-level decimal code which permits increased transmission speed over the binary and tertiary code systems known heretofore.

In accordance with one aspect of the present invention, the coded signal communication system includes a plurality of transmitters for transmitting coded frequency signals and a receiver for receiving the signals, and wherein each transmitter includes means for generating at least one transmitter address frequency pulse and a message frequency pulse, wherein each frequency pulse is of a frequency selected from one of 10 different frequencies of respectively increasing decimal weight representative of decimal numbers 0 through 9; and, a receiver which includes means for decoding the frequency pulses and providing an output indication thereof.

In accordance with a more limited aspect of the present invention, each transmitter includes frequency shift control means for selectively shifting the frequency of the transmitter output from a reference frequency to one or another of the 10 different frequencies.

In accordance with another aspect of the present invention, each transmitter includes a crystal-controlled oscillator and frequency shift control means includes a variable capacitance means, such as a Zener diode, coupled to the crystal of the oscillator for varying the oscillator output frequency, a plurality of frequency-determining impedances, a direct current voltage source, and means for selectively connecting the impedances in series with the capacitor means across the source so that the oscillator output frequency is changed in value dependent on the selected impedance.

In accordance with another aspect of the present invention, there is provided a receiver for receiving a train of coded frequency pulses including a first frequency pulse of a first reference frequency, a second frequency pulse of a second reference frequency, a transmitter message frequency pulse and at least one transmitter address frequency pulse, and wherein the frequencies of each second pulse and of each of the message and address pulses is one of 10 different frequencies of respectively increasing decimal weight representative of decimal numbers 0 through 9. This receiver includes means for receiving the frequency pulses and providing for each frequency pulse an output signal representative of the decimal weight of the associated frequency pulse, and decimal readout means for providing a decimal readout indication as to the decimal weight of each message and address signal.

In accordance with another aspect of the present invention, there is provided a coded signal communication system including a plurality of transmitters for transmitting coded frequency signals and a receiver for receiving the signals, wherein each transmitter includes circuit means for generating a reference frequency pulse, circuit means for generating a train of time-spaced frequency pulses representative of the location of the transmitter and at least one frequency pulse representative of a message wherein each frequency pulse is of a frequency selected from at least two different frequencies; and, the receiver includes decoder means for decoding the frequency pulses and indicator means for providing output indications representative of the location of the transmitter and the message.

The primary object of the present invention is to provide an improved code signaling system for transmitting and receiving coded frequency signals which incorporate both transmitter message and address information.

Another object of the present invention is to provide a 10-level radio call system incorporating frequency shift keying means in the system transmitters.

Another object of the present invention is to provide a code signaling system for transmitting frequency signals ranged in accordance with a decimal code so that each pulse is representative of one digit of a decimal number, whereby transmission time for transmitting the information is minimized.

Another object of the present invention is to provide a signal system which transmits information in a form compatible with decimal inputs and outputs.

A still further object of the present invention is to minimize the transmission time in a coded frequency communication system so that the cost per message transmitted may be minimized.

A still further object of the present invention is to provide an improved apparatus for varying the output frequency of a crystal-controlled oscillator.

Another object of the present invention is to provide an improved receiver for receiving and decoding a train of frequency pulses which incorporates frequencies representative of both a transmitter message and a transmitter address.

The foregoing and other objects and advantages of the invention will become apparent from the following description used to illustrate the preferred embodiment of the invention, as read in connection with the accompanying drawings in which:

FIG. 1 is an illustration of an application of the invention incorporating a pair of transmitters and a receiver;

FIGS. 2, 2A, 2B taken together is a combined schematic block diagram illustration of a transmitter constructed in accordance with the invention;

GENERAL DESCRIPTION

Figure 1:
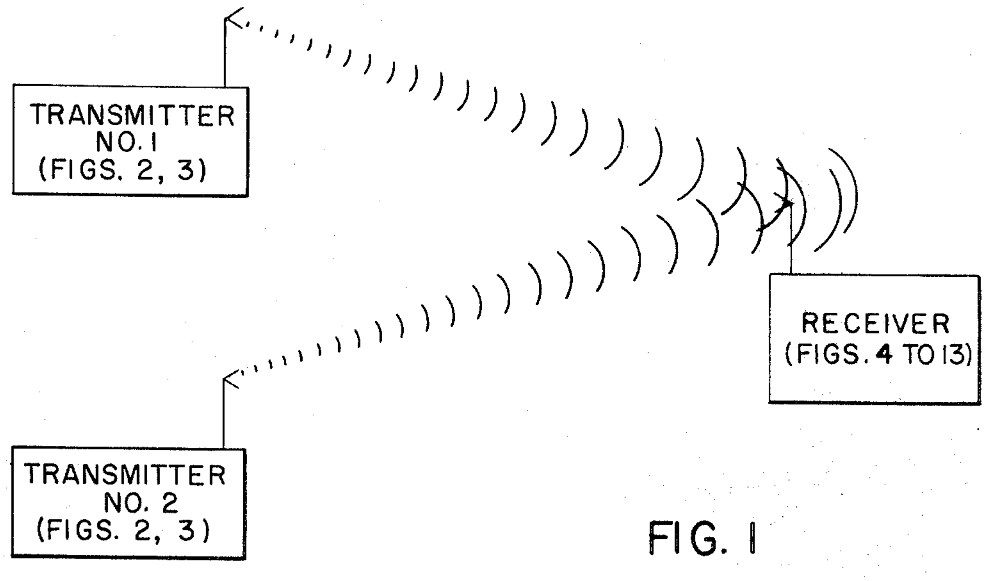

Referring now to the drawings and, more particularly, to FIG. 1, there is illustrated an application of the present invention as a radio emergency system. This system includes a plurality of transmitters (two only being shown for purposes of simplification) and a receiver. The details of construction and the theory of operation of each transmitter will be described in greater detail hereinafter with reference to FIGS. 2 and 3, and the details of construction and the theory of operation of the receiver will be described in greater detail hereinafter with reference to FIGS. 4 through 13. The transmitters may be located at selected points alongside a highway, or the like, and the receiver may be located at a central station. If a vehicle operator requires assistance, such as a tow truck, police, ambulance, et cetera, he merely presses one of a number of buttons, or the like, on a nearby transmitter. These buttons are representative of a series of different functions or messages. A coded signal is then transmitted to the receiver at the central station where the information is decoded and presented on a suitable decimal readout. This decimal readout will provide the operator at the central station with information as to the address of the calling transmitter together with the function desired, i.e., whether the caller requires an ambulance, police, tow truck, et cetera. As will be discussed in greater detail hereinafter, the coded signal transmitted includes a first and second reference frequency pulse together with a train of at least five frequency pulses. This train of five pulses includes a function or address pulse which is sequentially followed by a thousands pulse, a hundreds pulse, a tens pulse and a units pulse; the latter four pulses being indicative of the address and the function pulse being indicative of the message sent by the caller. Each of these five pulses is a frequency signal of one of 10 different frequencies respectively representative of decimal numbers 0 through 9. The two reference frequency pulses are required for decoding purposes in the receiver.

TRANSMITTER

Figure 2:
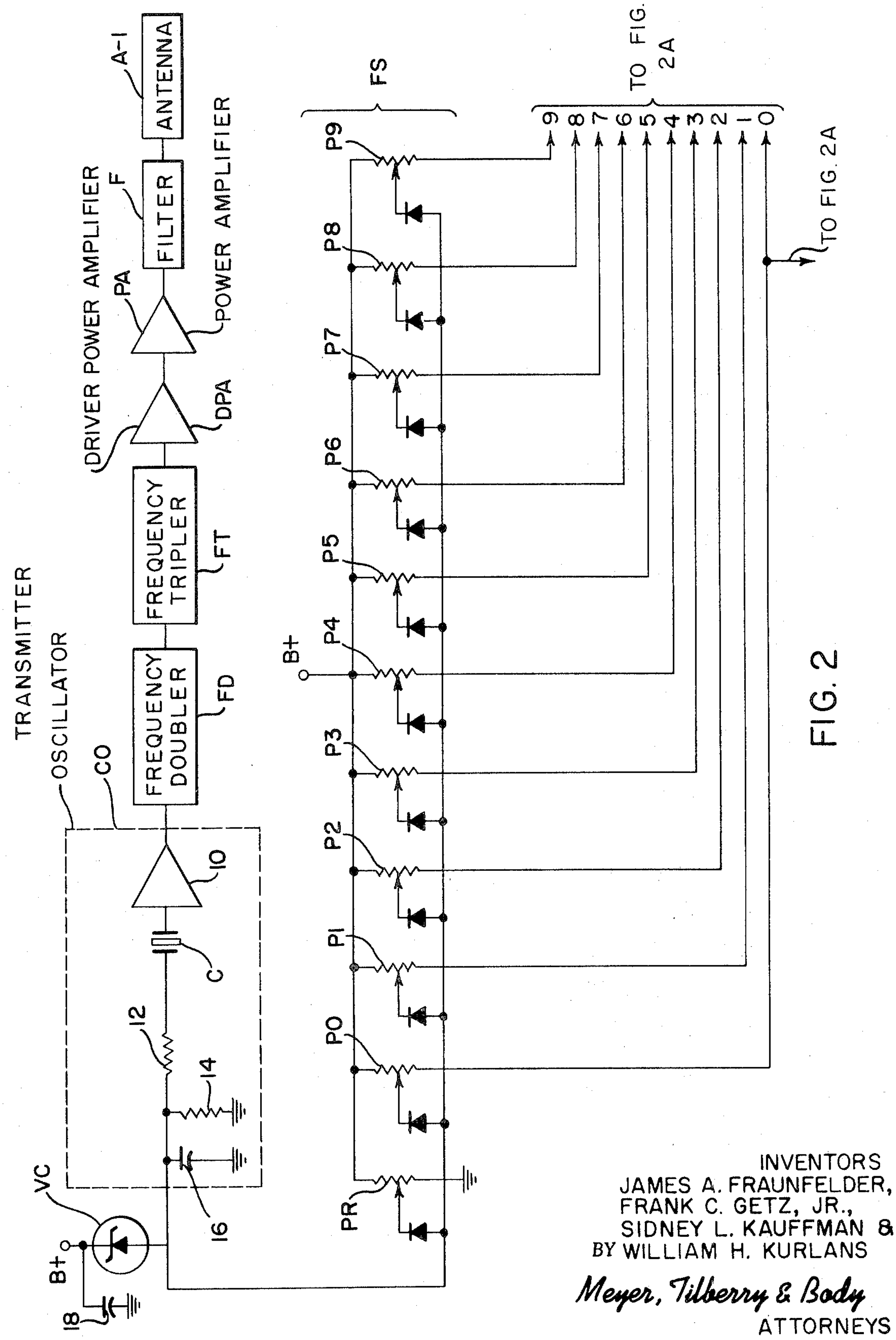
Figure 2A:
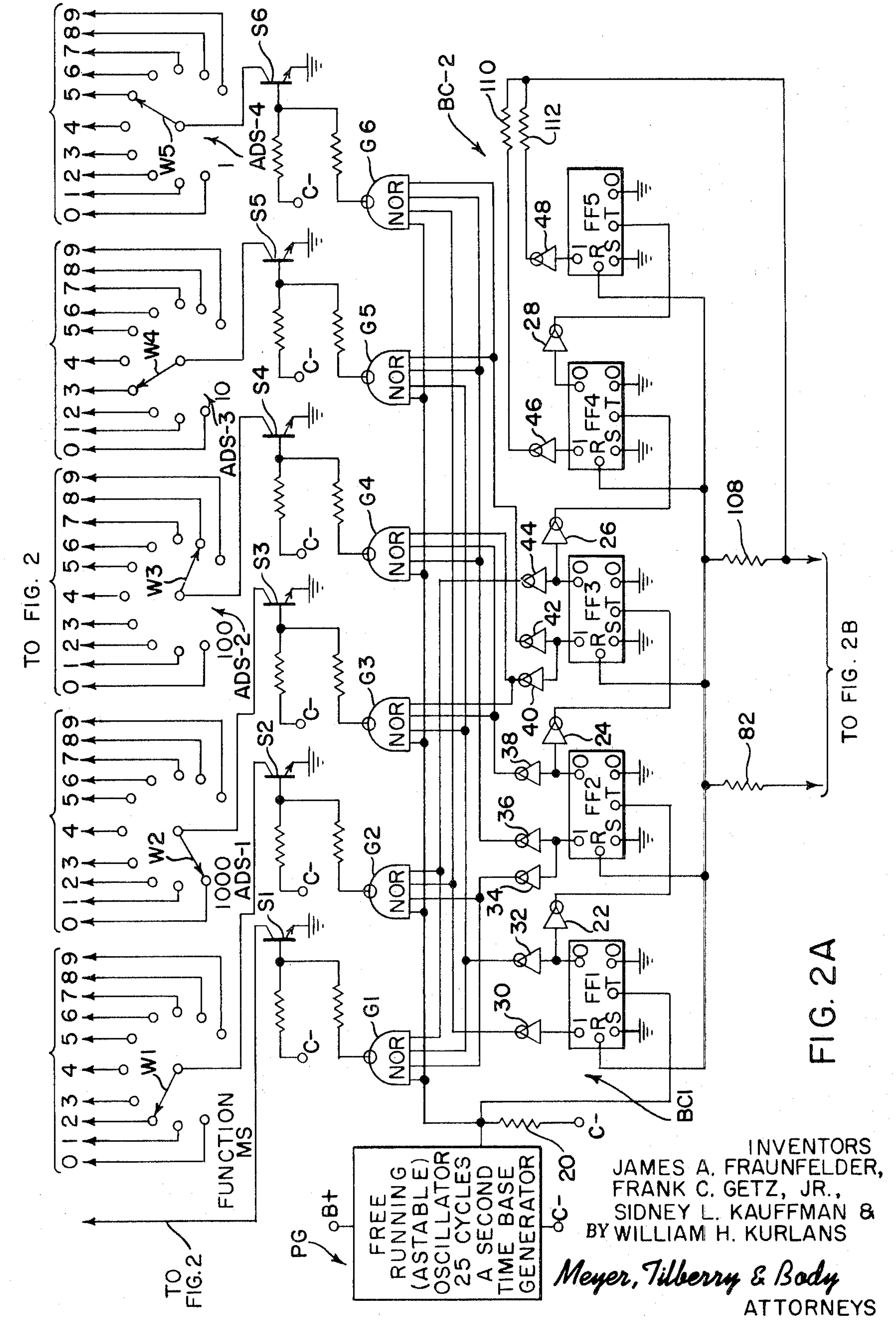
Figure 2B:
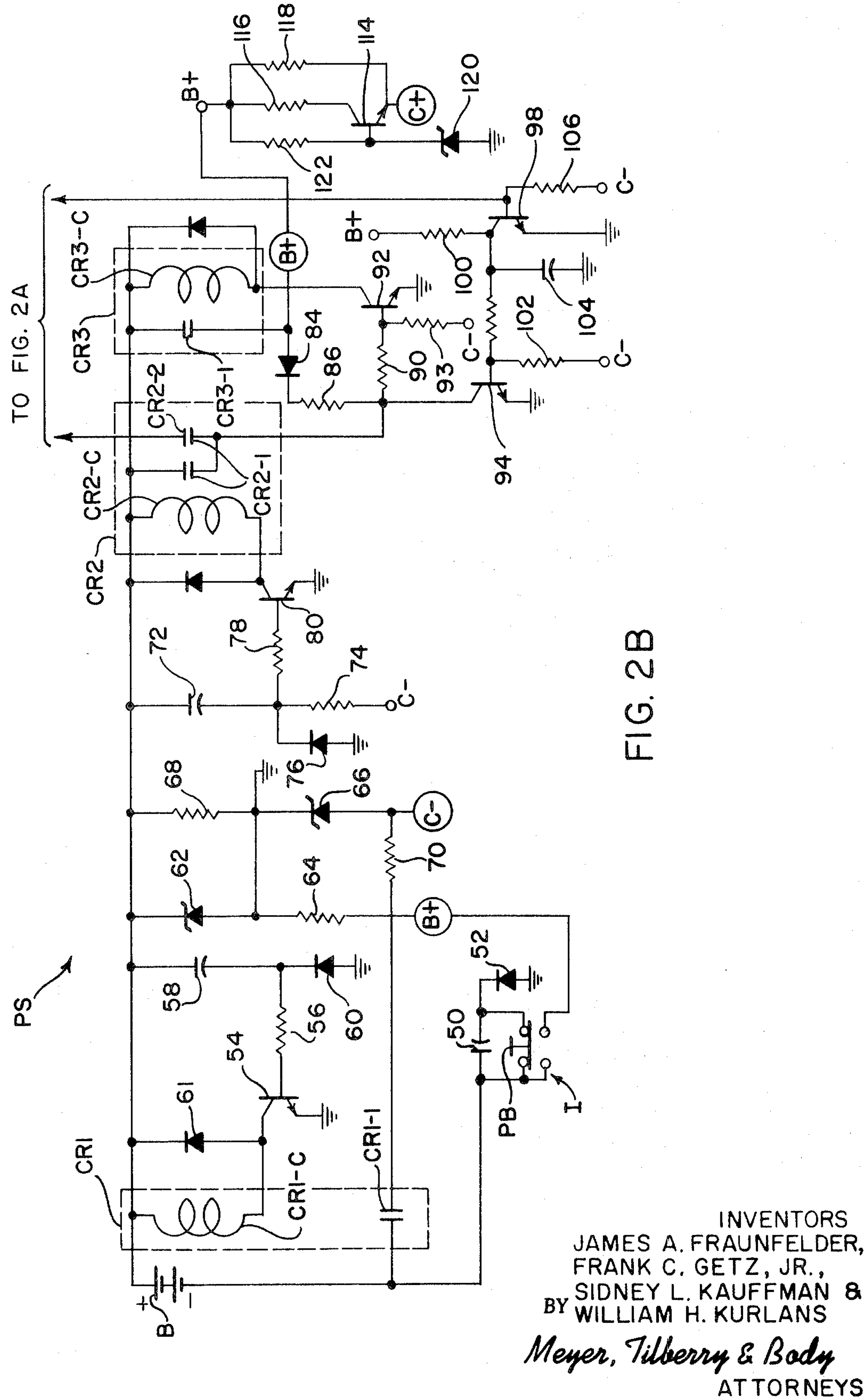

Referring now to FIG. 2, there is illustrated the preferred form of each transmitter used in the system. Thus, the transmitter generally comprises: a transmitter initiator I; a power supply circuit PS; a time base pulse generator PG; a three stage binary counter BC1; a two stage binary counter BC2; a plurality of NOR gates G1 through G6; a plurality of frequency-selecting switches S1 through S6; a message switch MS; a plurality of address decade switches ADS, including a thousands switch ADS-1, a hundreds switch ADS-2, a tens switch ADS-3 and a units switch ADS-4; a frequency shift circuit FS; a variable capacitance device VC; and, a crystal-controlled oscillator CO having its output coupled through a frequency doubler FD, a frequency tripler FT, a driver power amplifier DPA, a power amplifier PA, a filter F, and an antenna A-1. As shown, the message selector switch MS serves to select the message to be transmitted and the address decade switches ADS serve to select the address of the transmitter. Briefly, during the operation of the transmitter, the three-stage binary counter BC1 serves to count pulses received from the time base pulse generator PG. Depending on the pulse count, a match will be obtained at one of the six NOR-gates G1 through G6. Depending on which NOR gate has a match, one of the frequency level potentiometers P0 through P9 of the frequency shift circuit FS will be selected so that a portion of its resistance is placed in parallel with a reference potentiometer PR. Potentiometer PR is connected with the variable capacitive device VC. This varies the capacitive load to the crystal of a crystal-controlled oscillator CO to, in turn, change the output frequency of the transmitter. The two-stage binary counter BC1 is coupled to the three-stage binary counter BC2 which permits the train of transmitter pulses to be repeated three times, whenever the transmitter is activated.

OSCILLATOR AND FREQUENCY SHIFT CIRCUITS

The crystal-controlled oscillator CO includes a crystal C coupled to a unity gain amplifier 10 in a Colpitts oscillator configuration. The output of the amplifier 10 is coupled to a frequency doubler FD and thence through a frequency tripler FP, an amplifier DPA, an amplifier PA, a filter F and thence to antenna A-1, in a well-known manner. The input side of crystal C is connected to an RF blocking resistor 12 which, in turn, is connected through a constant load resistor 14 to ground. An RF bypass capacitor 16 is connected in parallel with resistor 14. The variable capacitance device VC is connected between capacitor 16 and a B+ voltage supply source. A capacitor 18 is connected in parallel with device VC between the B+ source and ground. Device VC may, for example, take the form of a Zener diode. As is well known, one characteristic of a Zener diode is that it serves as a voltage-controlled, variable capacitance device, wherein its capacitance varies inversely with the direct current voltage applied across its anode-cathode circuit. Since the cathode of the Zener diode variable capacitance device VC is connected to the B+ voltage supply source, its capacitance can be changed by varying the value of the potential applied to its anode. Thus, for example, if the direct current voltage applied to the anode of the Zener diode is decreased in a negative direction, then the voltage applied across the anode to cathode circuit of the diode is increased. Since the variable capacitance device VC serves as a capacitive load for the crystal C, a change in the potential applied to the anode of the Zener diode will result in a change in the output frequency of crystal controlled oscillator CO.

Figure 3:
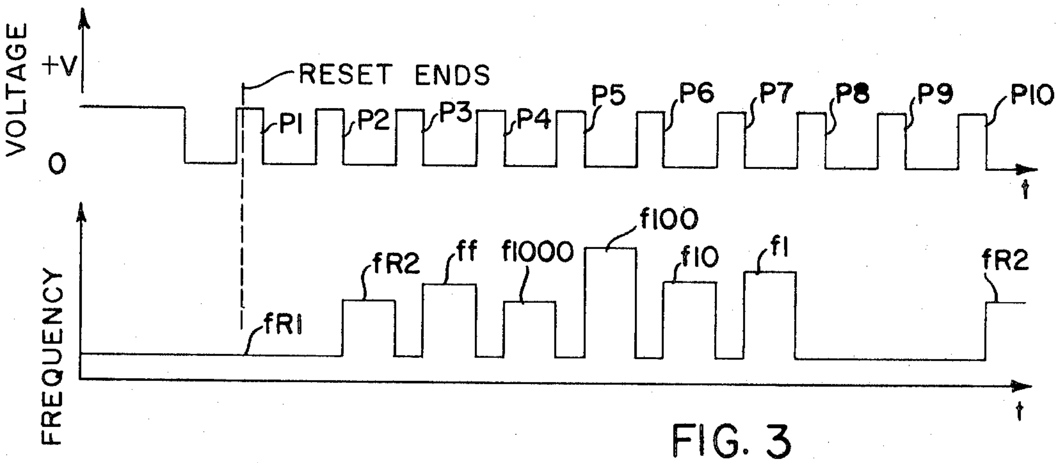
FIG. 3 is a graph showing waveforms illustrative of the operation of the transmitter.

The frequency shift circuit FS serves to selectively change the value of the potential applied to the anode of the Zener diode variable capacitance device VC. The frequency shift circuit FS includes eleven potentiometers PR and P0 through P9. The resistance portions of the potentiometers are connectable in parallel between the B+ voltage supply source and ground by means of frequency-selecting switches S1 through S6. .The resistance portion of the reference potentiometer PR serves to determine the first reference frequency FR1 of the transmitter as its resistance portion is always connected between the B+ voltage supply source and ground. Each potentiometer has its wiper arm connected through a diode to a common connection with the anode of the variable capacitance device VC. The position of the wiper arm of potentiometer PR is such that the output frequency of the transmitter, when only potentiometer PR is in effect, is at its lowest frequency, i.e., the first reference frequency FR1 (see FIG. 3). The adjustment of potentiometer P0 is such that when this potentiometer is selected so as to be parallel with potentiometer PR, the output frequency is the second reference frequency FR2 which, as shown in FIG. 3, is of greater value than the first reference frequency FR1. Also, the second reference frequency FR2 is representative of a 0 level or decimal number 0. Potentiometers P1 through P9 are adjusted so that when they are respectively connected in parallel with potentiometer PR the output frequency is increased in levels representative of decimal numbers 1 through 9. The lower ends of the resistance portions of potentiometers P0 through P9 respectively extend to terminals 0 through 9.

MESSAGE AND ADDRESS DECADE SWITCHES

The message switch MS as well as the address decade switches ASD-1 through ADS-4 include wiper arms W1 through W5, respectively, and each switch has 10 terminals labeled 0 though 9. Terminals 0 through 9 of each switch are respectively connected to terminals 0 through 9 extending from the frequency shift circuit FS. Wiper arms W1 through W5 serve to respectively connect frequency-selecting switches S2 through S6 to one of the potentiometers P1 through P9. These switches are shown by way of example, and could take various forms, such as a plurality of pushbuttons, or the like.

FREQUENCY-SELECTING SWITCHES

The frequency-selecting switches S1 through S6 take the form of NPN-transistors. The collector of transistor S1 is connected to terminal 0 of the frequency shift circuit FS and thence to the resistance portion of potentiometer P0. The collectors of transistor switches S2 through S6 are respectively connected through wiper arms W1 through W5 to a selected one of the potentiometers P1 through P9. Each transistor switch S1 through S6 has its base connected through a resistor to a C− voltage supply source, and also through a second resistor to the outputs of NOR-gates G1 through G6, respectively.

NOR GATES

Each of the NOR-gates G1 through G6 has four inputs, one being connected to the output of the time base generator PG and three additional inputs being connected to selected combinations of the outputs of flip-flops FF1, FF2 and FF3, which comprise the three-stage binary counter BC1. The NOR gates may take various forms and serve the function of providing a positive output signal, known as a binary 1 signal, when each of the four inputs receives a binary 0 signal, such as ground potential. Each NOR gate may take the form of one-half of an integrated circuit gate, Model MC 725P, provided by Motorola. If desired, each of these NOR circuits might also take the form of an RTL resistor transistor logic circuit, shown in FIG. 7.5 of General Electric's Transistor Manual, Seventh Edition.

TIME BASE PULSE GENERATOR AND BINARY COUNTER CIRCUITS

The time base pulse generator PG may take various forms, and preferably comprises a free running astable oscillator, having an output frequency on the order of 25 cycles per second. The output provided by the time base generator is a train of rectangular wave pulses and is applied through a resistor 20 to a C− voltage supply source so that the level of the output pulses appears as shown in the upper portion of FIG. 3. This waveform includes a train of pulses P1 through P10, having their trailing edges extending in a negative direction from a positive voltage level to a substantially zero voltage level. The three-stage binary counter BC1 includes three bistable multivibrators or flip-flops FF1, FF2, FF3. Similarly, the two-stage binary counter BC2 includes two flip-flops FF4 and FF5. The internal circuitry of each flip-flop does not form a part of the invention herein as many varied circuits could be used. One circuit which may be used as a flip-flop is one-half of a Motorola integrated flip-flop circuit, Model MC 790P, or the equivalent. Conventionally, such a flip-flop is labeled with terminals 1, 0 for the two stable states of the flip-flop together with label R for reset, label S for set, label C for the clear input and label T for the trigger input. All of the reset terminals R of flip-flops FF1 through FF5 are connected in common to a reset line and thence to the power supply circuit PS. The set S and clear C terminals of the flip-flops are connected to ground. The input trigger terminal T of each flip-flop is connected to terminal 0 of the preceding flip-flop through an inverter amplifier, with terminal T of the first flip-flop FF1 being directly connected to the output of the time base generator PG. Thus, inverter amplifiers 22, 24, 26 and 28 respectively connect flip-flop pairs FF1, FF2 and FF2, FF3 and FF3, FF4 and FF4, FF5. Each inverter amplifier serves to convert a ground or zero volt signal at its input to a positive signal, on the order of 2 volts, at its output. Conversely, each inverter amplifier converts a positive 2-volt signal at its input to a ground or zero signal at its output. In terms of binary notation, each inverter amplifier converts a binary 1 signal to binary 0 signal or, conversely, a binary 0 signal to a binary 1 signal. A suitable form of inverter amplifier may take the form of one-sixth of a Motorola Model MC 789P integrated circuit inverter amplifier. Terminal 1 of flip-flop FF1 is connected through an inverter amplifier 30 to one input each of gates G2 and G6. Terminal 0 of flip-flop FF1 is connected through an inverter amplifier 32 to one input each of gates G1, G3 and G5. Similarly, terminal 1 of flip-flop FF2 is connected through an inverter amplifier 34 to one input each of gates G1 and G2. Terminal 1 of flip-flop FF2 is also connected through a second inverter amplifier 36 to one input each of gates G4, G5 and G6. Terminal 0 of flip-flop FF2 is connected through an inverter amplifier 38 to one input each of gates G3 and G4. Terminal 1 of flip-flop FF3 is connected through an inverter amplifier 40 to one input each of gates G3 and G4. Similarly, a second inverter amplifier 42 connects terminal 1 of flip-flop FF3 to one input each of gates G5 and G6. Lastly, terminal 0 of flip-flop FF3 is connected through an inverter amplifier 44 to one input each of gates G1 and G2. Terminals 1 of flip-flops FF4 and FF5 of the two-stage binary counter BC-2 are respectively connected through inverter amplifiers 46 and 48 to the power supply circuit PS.

POWER SUPPLY AND INITIATOR

The initiator I may take the form of a spring-biased, normally open pushbutton PB, connected between the negative side of a battery B and to ground through a capacitor 50 and a diode 52, poled as shown.

The power supply PS serves to provide the B+, B−, C+ and C− potentials for the transmitter. The power supply includes a relay CR1 having a coil CR1-C and a pair of normally open contacts CR1-1. Contacts CR1-1 are connected between the negative side of battery B and the terminal labeled B–. Relay coil CR1-C is connected to the positive side of battery B and thence to the collector of an NPN-transistor 54, having its emitter connected to ground. The base of transistor 54 is connected through a resistor 56 and thence to the junction of a capacitor 58 and a diode 60, poled as shown, which form a series circuit between ground and the positive side of battery B. A diode 61, poled as shown, is connected in parallel with coil CR1-C. A Zener diode 62, poled as shown, is connected in series with a resistor 64 between the positive side of battery B and terminal B–. A second Zener diode 66, poled as shown, is connected in series with a resistor 68 between terminal C– and the positive side of battery B. The junction between Zener diode 62 and resistor 64 is connected to the junction of resistor 68 and Zener diode 66 and thence to ground. Terminals B– and C– are connected together by resistor 70.

The junction of Zener diode 62 and resistor 68 is connected through a capacitor 72 and thence through a resistor 74 to the C– terminal. The junction of capacitor 72 and resistor 74 is connected through a diode 76, poled as shown, and thence to ground. This junction is also connected through a resistor 78 and thence to the base of a NPN-transistor 80, having its emitter connected to ground and its collector connected through coil CR2-C of relay CR2, and thence to the positive side of battery B. Relay CR2 also includes normally open relay contacts CR2-1 and CR2-2. Contacts CR2-2 are connected from one side of contacts CR2-1 and thence through a resistor 82 to a reset line connected with the reset terminals R of each of the flip-flops FF1 through FF6 of the binary counters BC1 and BC2. The other side of relay contacts CR2-1 is connected to the positive side of battery B.

The power supply circuit includes a third relay CR3 having a relay coil CR3-C and a set of normally open relay contacts CR3-1. Contacts CR3-1 are connected between the positive side of battery B and a diode 84. Diode 84 is connected through a resistor 86 and a resistor 88 to the junction of relay contacts CR2-2 and CR2-1. The junction of resistors 86 and 88 is connected through a resistor 90 and thence to the base of an NPN-transistor 92, having its collector connected to coil CR3-C and its emitter connected to ground. The base of transistor 92 is also connected through a resistor 93 to the C– voltage supply terminal. The junction of resistors 86 and 88 is also connected to the collector of an NPN-transistor 94 having its emitter connected to ground. The base of transistor 94 is connected through a resistor 96 to the collector of a second NPN-transistor 98 having its emitter connected to ground and its collector connected through a resistor 100 to the B+ voltage supply source. The base of transistor 94 is also connected through a resistor 102 to the C– voltage supply source. Also, the collector of transistor 98 is connected through a capacitor 104 to ground. The base of transistor 98 is connected through a resistor 106 to the C– voltage supply source and is also connected through a resistor 108 to the reset line, which is connected to the reset terminals R of flip-flops FF1 through FF5. The junction of resistors 106 and 108 is also connected through a resistor 110 to the output side of inverter amplifier 46 and through a resistor 112 to the output side of inverter amplifier 48. The junction of diode 84 and relay contacts CR3-1 is connected to the B+ terminal which, in turn, provides B+ power for an NPN-transistor 114. This transistor has its collector connected through a resistor 116 to the B+ terminal and its emitter connected to the C+ terminal. A resistor 118 is connected between the C– terminal and the B+ terminal. The base of transistor 114 is connected through a Zener diode 120, poled as shown, and thence to ground. A resistor 122 connects the base of transistor 114 with the B+ terminal.

TRANSMITTER OPERATION

It is contemplated that a plurality of transmitters be incorporated in a system. Accordingly, each transmitter should have its address decade switches ADS adjusted in accordance with the address or box number of the respective transmitter. As shown in FIG. 2, the thousands, hundreds, tens and units address switches are respectively adjusted to represent a 4-digit decimal number 0835. The message switch MS has ten positions 0 through 9. It is contemplated that each position be representative of a particular message, such as ambulance, fire, tow truck, et cetera. The message switch MS is adjusted to represent decimal number 2. If desired, the 10-position switch MS may be replaced by 10 different pushbuttons to accomplish the same function of connecting frequency selecting switch S2 to one of the potentiometers P0 through P9. Such pushbutton switches could be incorporated with the pushbutton PB of the initiator. As shown in FIG. 2, however, the transmitter is activated by adjusting wiper arm W1 of message switch MS to the desired position, representative of the message to be transmitted and then the operator depresses pushbutton PB in the initiator circuit I. The circuit including relay CR1 and transistor 54 serves as a latching circuit to provide power for the transmitter for a period which exceeds the time required to transmit three rounds of signals. Accordingly, upon a momentary closure of pushbutton PB, transistor 54 will be biased into conduction, energizing relay CR1. This transistor will continue to conduct until capacitor 58 charges sufficiently to reverse bias the transistor. The time required for this to occur is on the order of 10 seconds, which is substantially greater than the time required for the transmitter to complete transmission of three rounds of coded signals. Relay contacts CR1-1 become closed and serve as a holding circuit after the pushbutton PB has returned to its normally open position. B– and C– power supply potentials will now appear at terminals B– and C– through activation of Zener diodes 62 and 66.

Transistor 80 is biased into conduction, whereupon relay CR2 becomes energized, closing contacts CR2-1 and CR2-2. Transistor 80 will remain in a saturating conductive condition until capacitor 72 becomes charged, a time delay on the order of substantially 100 milliseconds. While transistor 80 is in conduction, a forward bias is applied through now closed relay contacts CR2-1 to bias transistor 92 into conduction. Also, a positive signal from the positive side of battery B is applied through now closed contacts CR2-1 and CR2-2 through resistor 82 to the reset terminals R of all flip-flops in the binary counters BC1 and BC2. This resets all flip-flops. At the reset condition, the outputs at terminals 1 of flip-flops FF4 and FF5 is at a binary 0 state, i.e., 0 volts, and this provides through inverters 46 and 48 a positive signal for biasing transistor 98 into conduction. Also, since transistor 92 is biased into conduction, B+ potential is provided at the B+ terminal. With the B+ voltage present, transistor 114 is biased into conduction so as to provide positive potential at the C– terminal through activation of Zener diode 120.

Once both the C– and B+ terminals are activated, the time base generator PG commences generation of rectangular wave pulses. At that time the only potentiometer in effect is the reference potentiometer PR and, accordingly, the output signal radiated by antenna A-1 is of the first reference frequency *f*R1 (see FIG. 3). After the flip-flops are reset (see FIG. 3) the negative edge of the next pulse P1 serves to trigger the first flip-flop FF1 in the binary counter BC1. This, however, does not change the output frequency of the transmitter since a match has not been obtained at any of the gates G1 through G6 so as to activate one of the potentiometers P0 through P9. Upon the trailing or negative edge of the second pulse P2, a match is obtained at gate G1. That is, with reference to FIG. 3, during the time between the negative edge of pulse P2 until the positive going edge of pulse P3 a binary 0 signal is applied from the output of the time base generator PG to one of the outputs of each NOR-gate G1 through G6. Also, when the binary counter BC1 has counted two pulses, the outputs of terminals 1 and 0 of flip-flop FF1 are 0 volts (binary 0 signal) and 2 volts (binary 1 signal) respectively; the outputs of terminals 1 and 0 of flip-flop FF2 are 2 volts and zero volts respectively; and, the outputs of terminals 1 and 0 of flip-flop FF3 are 0 volts and 2 volts respectively. Therefore, the only gate which has a match, i.e., a binary 0 signal applied to each of its four inputs, is gate G1. The output circuit of gate G1 carries a positive binary 1 signal for biasing transistor switch S1 into conduction. This connects the resistance portion of potentiometer P0 between the B+ voltage supply source and ground. Thus, the resistance portions between the wiper arms and ground of potentiometers PR and P0 are now connected in parallel and thence in series with the variable capacitive device VC across the B+ voltage supply source. This, of course, decreases the potential applied to the anode side of the variable capacitor device VC so that the applied voltage across the device is increased. Accordingly, the capacitance has changed inversely with the applied voltage and the decreased capacitance load to the crystal increases the output frequency from the first reference frequency $fR2$ to the second reference frequency $fR2$ (see FIG. 3). As the binary counter BC1 counts additional pulses P3 through P7 (see FIG. 3), the frequency-selecting switches S2 through S6 are sequentially biased into conduction to connect their associated potentiometers in parallel with potentiometer PR, in the same manner as described above relative to potentiometer P0. During the period that each of the pulses P1 through P10 (see FIG. 3) goes positive, and until the pulse again goes negatively, no match can be obtained at any of the gates G1 through G6. During such periods only potentiometer PR is in effect and, accordingly, the transmitter output frequency is that of the reference frequency $fR1$. This is illustrated by the wave forms in FIG. 3.

So that the operation of the binary counters BC1 and BC2 may be more readily appreciated, reference should now be made to the TRANSMITTER LOGIC TRUTH TABLE I presented below. As shown in this table I, 24 pulses are counted by the two binary counters. The state of each side or terminal 1 and 0 of each flip-flop FF1 through FF5 is tabulated, together with the signal being radiated at that time.

TRANSMITTER LOGIC TRUTH TABLE I

| After puls | FF1 (side) 1 | 0 | FF2 (side) 1 | 0 | FF3 (side) 1 | 0 | FF4 (side) 1 | 0 | FF5 (side) 1 | 0 | Volts | Signal emitted |
|---|---|---|---|---|---|---|---|---|---|---|---|---|
| Reset | 0 | 2 | 0 | 2 | 0 | 2 | 0 | 2 | 0 | 2 | Volts | FR1 |
| 1 | 2 | 0 | 0 | 2 | 0 | 2 | 0 | 2 | 0 | 2 | do | FR1 |
| 2 | 0 | 2 | 2 | 0 | 0 | 2 | 0 | 2 | 0 | 2 | do | FR2 |
| 3 | 2 | 0 | 2 | 0 | 0 | 2 | 0 | 2 | 0 | 2 | do | Ff |
| 4 | 0 | 2 | 0 | 2 | 2 | 0 | 0 | 2 | 0 | 2 | do | $F_{1,000}$ |
| 5 | 2 | 0 | 0 | 2 | 2 | 0 | 0 | 2 | 0 | 2 | do | $F_{100}$ |
| 6 | 0 | 2 | 2 | 0 | 2 | 0 | 0 | 2 | 0 | 2 | do | $F_{10}$ |
| 7 | 2 | 0 | 2 | 0 | 2 | 0 | 0 | 2 | 0 | 2 | do | $F_1$ |
| 8 | 0 | 2 | 0 | 2 | 0 | 2 | 2 | 0 | 0 | 2 | do | FR1 |
| 9 | 2 | 0 | 0 | 2 | 0 | 2 | 2 | 0 | 0 | 2 | do | FR1 |
| 10 | 0 | 2 | 2 | 0 | 0 | 2 | 2 | 0 | 0 | 2 | do | FR2 |
| 11 | 2 | 0 | 2 | 0 | 0 | 2 | 2 | 0 | 0 | 2 | do | Ff |
| 12 | 0 | 2 | 0 | 2 | 2 | 0 | 2 | 0 | 0 | 2 | do | $F_{1,000}$ |
| 13 | 2 | 0 | 0 | 2 | 2 | 0 | 2 | 0 | 0 | 2 | do | $F_{100}$ |
| 14 | 0 | 2 | 2 | 0 | 2 | 0 | 2 | 0 | 0 | 2 | do | $F_{10}$ |
| 15 | 2 | 0 | 2 | 0 | 2 | 0 | 2 | 0 | 0 | 2 | do | F1 |
| 16 | 0 | 2 | 0 | 2 | 0 | 2 | 0 | 2 | 2 | 0 | do | FR1 |
| 17 | 2 | 0 | 0 | 2 | 0 | 2 | 0 | 2 | 2 | 0 | do | FR1 |
| 18 | 0 | 2 | 2 | 0 | 0 | 2 | 0 | 2 | 2 | 0 | do | FR2 |
| 19 | 2 | 0 | 2 | 0 | 0 | 2 | 0 | 2 | 2 | 0 | do | Ff |
| 20 | 0 | 2 | 0 | 2 | 2 | 0 | 0 | 2 | 2 | 0 | do | $F_{1,000}$ |
| 21 | 2 | 0 | 0 | 2 | 2 | 0 | 0 | 2 | 2 | 0 | do | $F_{100}$ |
| 22 | 0 | 2 | 2 | 0 | 2 | 0 | 0 | 2 | 2 | 0 | do | $F_{10}$ |
| 23 | 2 | 0 | 2 | 0 | 2 | 0 | 0 | 2 | 2 | 0 | do | F1 |
| 24 | 0 | 2 | 0 | 2 | 0 | 2 | 2 | 0 | 2 | 0 | do | STOP |

As shown above, three rounds of signals are transmitted (one round only is shown in FIG. 3). After the 24th pulse, terminals 1 of flip-flops FF4 and FF5 provide positive 2-volt output signals (binary 1 signals). These signals are inverted by inverter amplifiers 46 and 48 so that binary 0 signals are transmitted through resistors 110 and 112 to the base of transistor 98. This reverse biases transistor 98 which, in turn, permits transistor 94 to be biased into conduction. Once transistor 94 is forward biased into conduction, it removes the positive forward bias for transistor 92. When transistor 92 becomes reversed biased, relay CR3-3 becomes deenergized, removing the B+ and C+ potentials from the circuit, thereby preventing further transmission of coded signals. Once capacitor 58 has completed its charging time (on the order of 10 seconds as opposed to a three-round transmission time of substantially 1 second) the B− and C− potentials are lost, thereby reverse biasing transistor 54. The transmitter is now in condition to be activated again by a momentary closure of pushbutton PB.

RECEIVER

Figure 4:
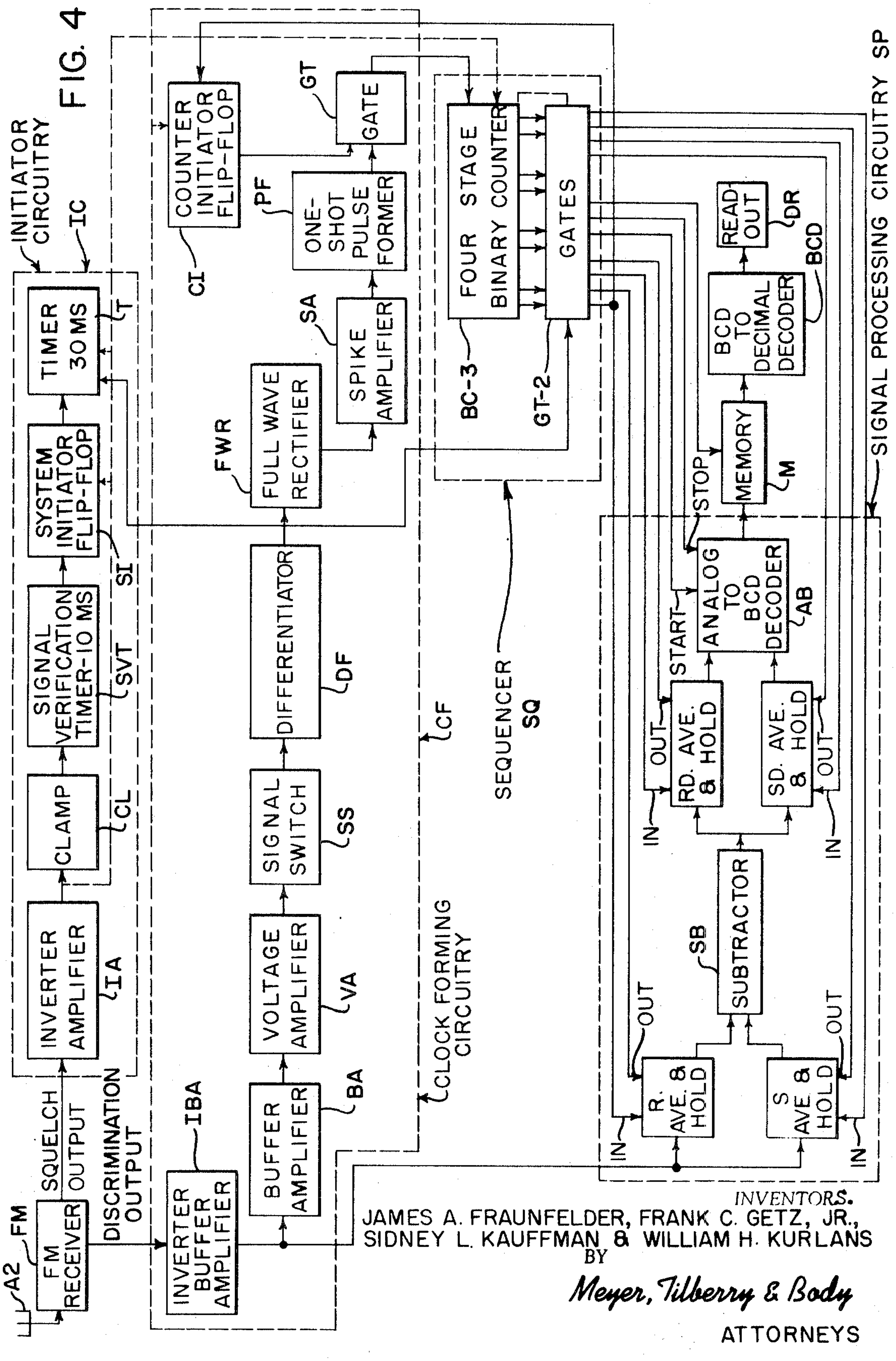
FIG. 4 is a block diagram illustrating a receiver constructed in accordance with the invention.

Referring now to FIG. 4, the receiver is illustrated in block diagram form. As shown, the receiver generally comprises a receiving antenna A-2; a frequency-modulated receiver FM having a squelch output and a discriminator output; an initiator circuit IC coupled to the squelch output of receiver FM; a clock-forming circuit CF coupled to the discriminator output of receiver FM; a sequencer SQ coupled both to the initiator circuit IC and the clock-forming circuit CF; and, a signal-processing circuit SP coupled both to the clock-forming circuit CF as well as to the sequencer SQ. The receiver FM may be a standard frequency-modulated receiver, such as the General Electric MASTR Progress Line Receiver, Type ER-40, or equivalent. Such a receiver has two outputs known as the squelch output and the discriminator output. The discriminator output carries a voltage level signal which is of a value directly proportional to the received frequency levels. The output of the squelch circuit, in the absence of a received signal, is substantially on the order of 9 volts. This output decreases to substantially zero volts upon receipt of a signal from the transmitter. Briefly, the initiator circuitry IC serves to sense whether, in fact, a signal has been received from one of the system transmitters. If so, it permits the sequencer circuit SQ to receive a train of pulses from the clock-forming circuitry CF. The sequencer, in turn, controls the operation of the signal-processing circuitry which serves to process the signals received from one of the system transmitters and then provide a decimal readout.

INITIATOR CIRCUITRY

Figures 5, 8:
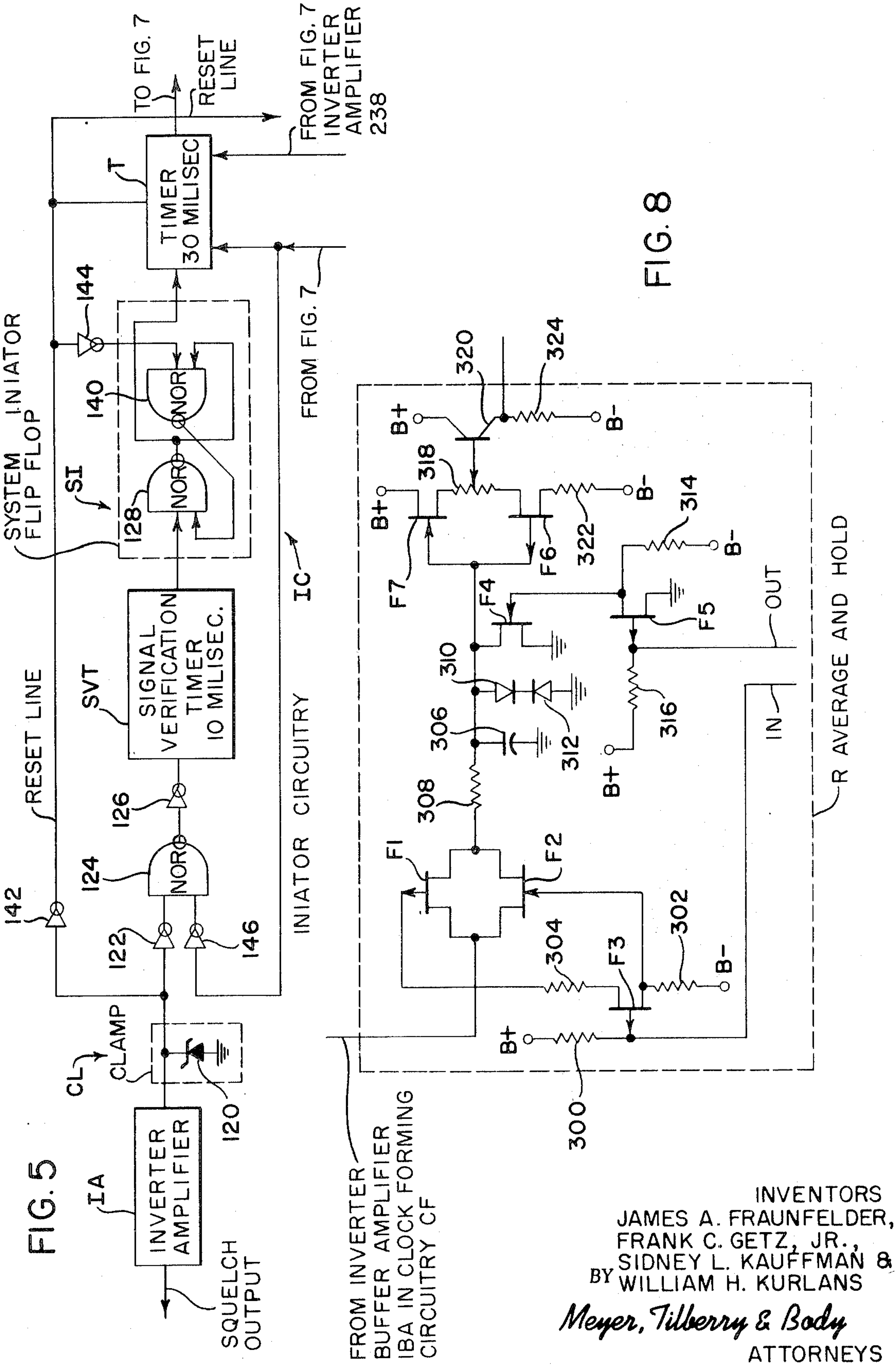
FIG. 5 is a block diagram illustrating, in greater detail, the initiator circuit of FIG. 4.
FIG. 8 is a schematic illustration of an average-and-hold circuit shown in block diagram form in FIG. 4.

The initiator circuit IC is best illustrated in FIG. 5, and includes an inverter amplifier IA having its input coupled to the squelch output of receiver FM. The output of the inverter amplifier is clamped to ground potential by means of a clamp CL, which includes a Zener diode 120, poled as shown. The output of clamp CL is coupled through an inverter amplifier 122 and thence to a NOR-gate 124. The output of NOR-gate 124 is coupled through an inverter amplifier 126 to a 10-millisecond signal verification timer SVT. This timer may take any suitable form and serves upon receipt of a binary 0 signal from the inverter amplifier 126 to time a predetermined period of time, such as on the order of 10 milliseconds, and then provide a gating signal at its output circuit. The output circuit of the signal verification timer SVT is coupled to a system initiation flip-flop circuit SI. Circuit SI may take various forms, including a pair of NOR-gates 128 and 140 connected together to define a bistable multivibrator circuit. The output of the system initiator flip-flip SI is taken at the output of NOR-gate 128 and is coupled to a 30-millisecond timer T. Timer T may take the form as discussed before with reference to the signal verification timer SVT. The output of timer T is coupled to the gates of the sequencer circuit SQ, to be described in detail hereinafter with reference to FIG. 7. The output circuit of clamp CL is also coupled to a reset line through an inverter amplifier 142. The output of the inverter amplifier 142 is coupled through an inverter amplifier 144 to the input side of NOR-circuit 140 in the system initiator flip-flop circuit SI. The output of inverter amplifier 142 is also applied to the timer T, as well as through a reset line to the sequencer SQ, as will be described in greater detail hereinafter with reference to FIG. 7, and to the clock-forming circuitry CF, to be described in greater detail hereinafter with reference to FIG. 6. One output of the sequencer SQ is applied to timer T as well as through an inverter amplifier 146 to the input side of NOR-gate 124.

CLOCK-FORMING CIRCUITRY

Figure 6:
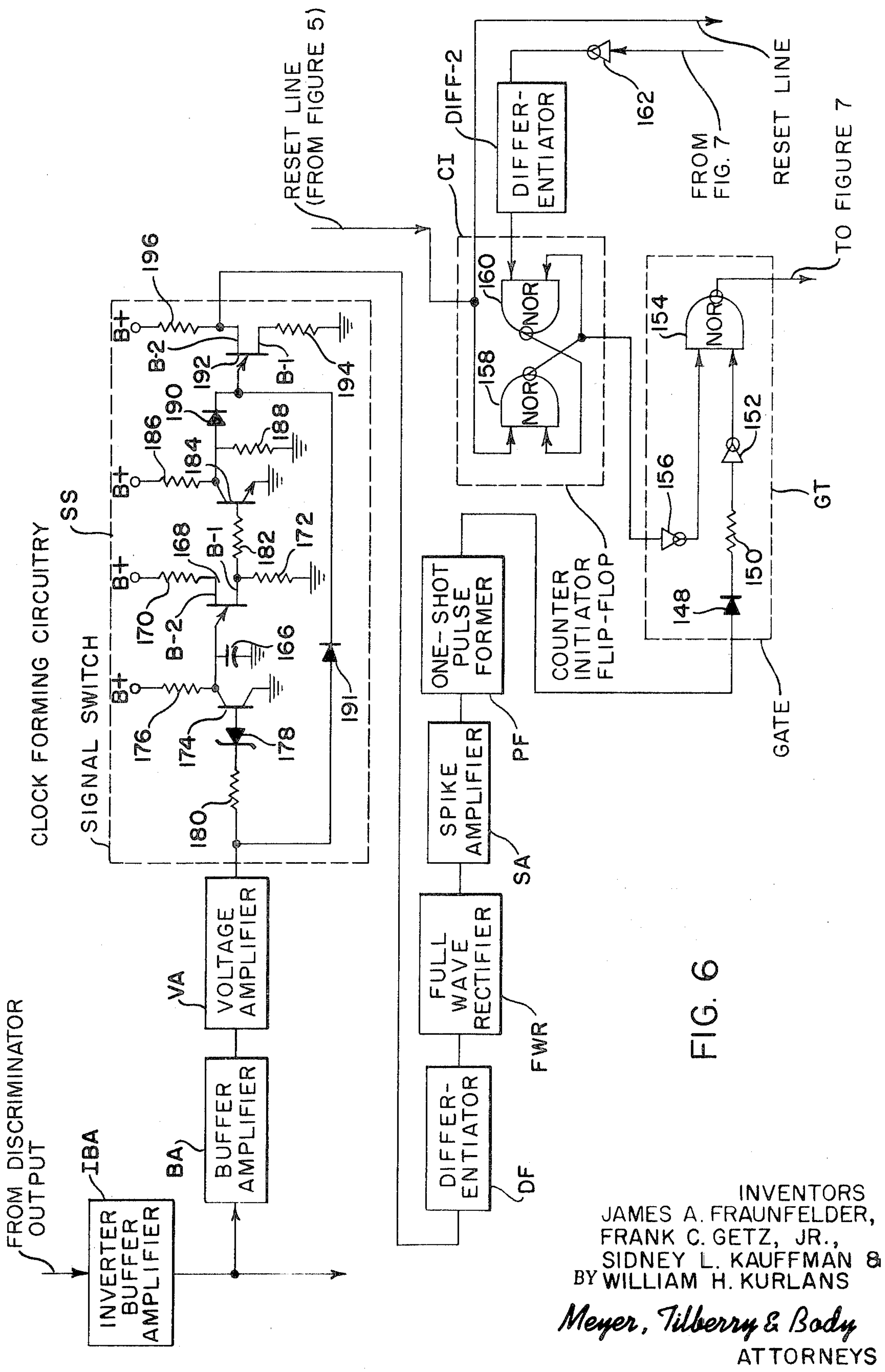
FIG. 6 is a combined schematic block diagram illustration of the clock forming circuitry illustrated in FIG. 4.

The clock-forming circuitry CF is best shown in FIG. 6, and includes an inverter buffer amplifier IBA having its input connected to the discriminator output of receiver FM. The output of inverter buffer amplifier IBA is coupled to a buffer amplifier BA, the output of which is coupled through a voltage amplifier VA to a signal switch SS. The output of the signal switch SS is coupled through a differentiator DF to a fullwave rectifier FWR. The output of the fullwave rectifier is coupled through a spike amplifier SA, to a one-shot pulse former PF. The output of the one-shot pulse former PF is coupled to a gate GT having its output connected to binary counter BC3, shown in FIG. 7. Gate GT includes a diode 148, poled as shown, connected through a resistor 150 and an inverter amplifier 152 to one input of a NOR-gate 154. NOR-gate 154 has a second input coupled to a counter initiator flip-flop circuit CI, through an inverter amplifier 156. The initiator flip-flop includes a pair of NOR-gates 158 and 160 connected together to define a bistable multivibrator circuit. The output of the counter initiator flip-flop CI is taken from the output of NOR-gate 158 and thence through the inverter amplifier 156 to NOR-gate 154. One input to the NOR-gate 158 is taken from the reset line originating in FIG. 5. Also, one input of the NOR-gate 160 is taken through a differentiator DIFF-2 and an inverter amplifier 162 from the sequencer SQ of FIG. 7.

The signal switch SS includes a unijunction relaxation oscillator circuit including a capacitor 166 and a unijunction transistor 168. Capacitor 166 is connected between ground and the emitter of unijunction transistor 168. Unijunction transistor 168 has its base B2 connected through a resistor 170 to the B+ voltage supply source and its base B1 connected through a resistor 172 to ground. Capacitor 166 is connected across the collector to emitter circuit of an NPN-transistor 174, having its collector connected through a resistor 176 to the B+ voltage supply source. The base of transistor 174 is connected through a Zener diode 178, poled as shown, and thence through a resistor 180 to the output side of voltage amplifier VA. The output of the unijunction transistor is taken across resistor 172 and is coupled through a resistor 182 to the base of an NPN-transistor 184, having its emitter connected to ground. The collector of transistor 184 is connected through a resistor 186 to the B+ voltage supply source, as well as through a resistor 188 to ground. A diode 190, poled as shown, connects the collector of transistor 184 to the emitter of a second unijunction transistor 192. Also, the junction between the voltage amplifier VA and resistor 180 is connected to the emitter of unijunction transistor 192 through a signal path, including diode 191, poled as shown. Unijunction transistor 192 has its base B1 connected through a resistor 194 to ground, and its base B2 connected through a resistor 196 to the B+ voltage supply source. The output of the signal switch SS is taken at base B2 of unijunction transistor 196 and is coupled to the input of differentiator DF.

SEQUENCER

Figure 7:
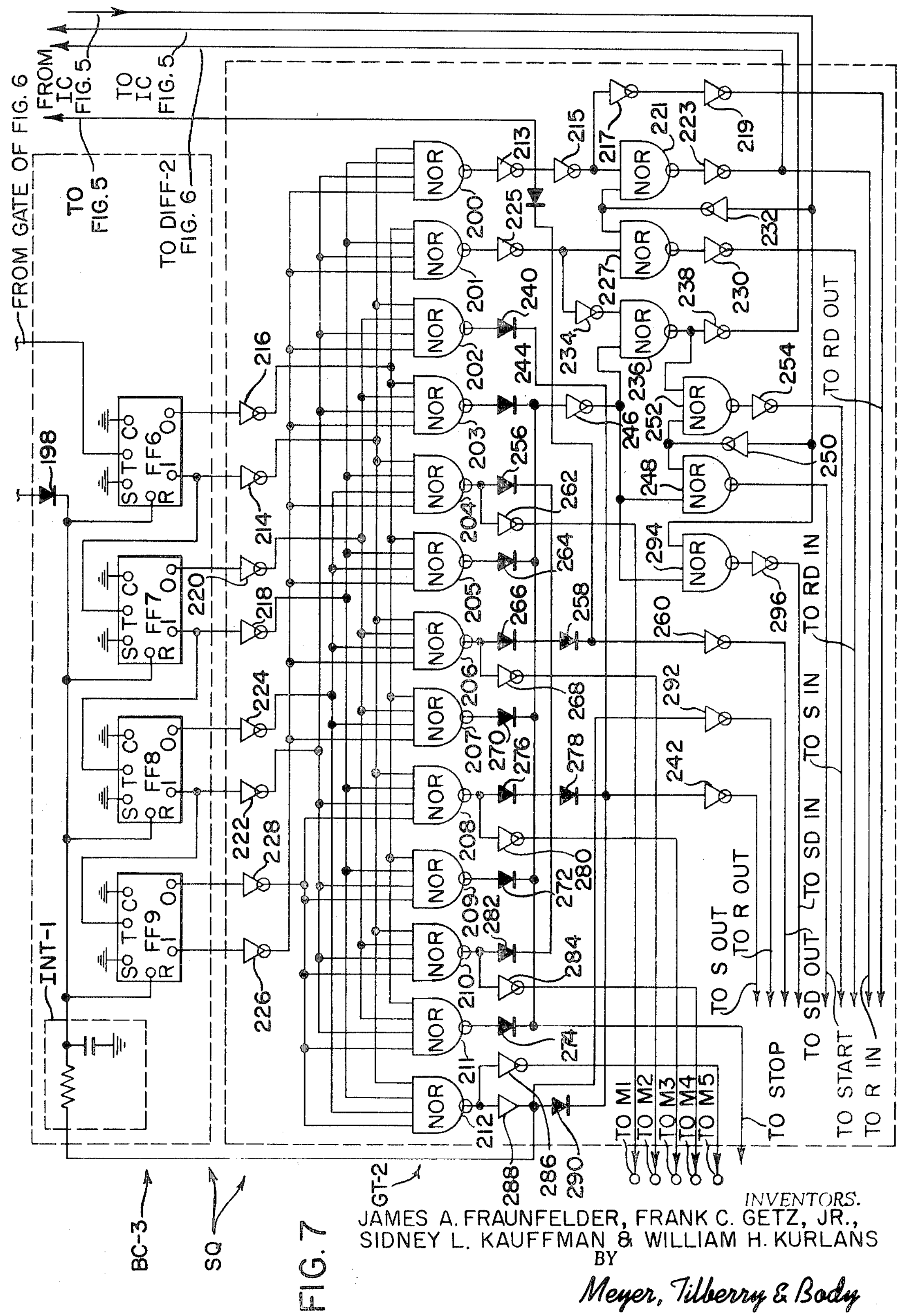
FIG. 7 is a combined schematic block diagram illustration of the sequencer shown in FIG. 4.

The sequencer SQ, as best illustrated in FIG. 7, includes a four-stage binary counter BC3 and a gate circuit GT2. Binary counter BC3 includes four flip-flops FF6, FF7, FF8 and FF9 connected to define a four-stage binary counter. Each flip-flop corresponds in structure with the flip-flops discussed hereinbefore with reference to binary counters BC1 and BC2 in the transmitter of FIG. 2. The reset terminal R of each flip-flop FF6 through FF9 is connected to the reset line from FIG. 6 through a diode 198. The input to the binary counter BC3 is taken at the input trigger terminal T of flip-flop FF6 from the output of NOR-gate 154 in gate circuit GT of FIG. 6. The 1 terminal of each flip-flop is connected to the trigger terminal T of the next succeeding flip-flop in the order from flip-flop FF6 to flip-flop FF9.

The gate circuit GT2 includes 12 NOR-gates 200 through 212. Each of these NOR gates has four inputs and one output. A binary 1 signal is present on the output of each NOR gate when all of its inputs receive a binary 0 signal, otherwise, the NOR gate has a binary 0 output. As shown, each NOR gate has its four inputs connected to a different combination of the outputs of the four flip-flops FF6 through FF9. To provide for amplification, the 1 and 0 terminals of the flip-flops are coupled through amplifiers to the gates 200 through 212. Thus, the 1 and 0 terminals of flip-flop FF6 are respectively coupled to amplifiers 214 and 216; the 1 and 0 terminals of flip-flop FF7 are respectively coupled to amplifiers 218 and 220; the 1 and 0 terminals of flip-flop FF8 are respectively coupled to amplifiers 222 and 224; and, the output terminals 1 and 0 of flip-flop FF9 are respectively coupled to amplifiers 226 and 228. The four inputs of gate 200 are connected to the 1 terminals of each of the four flip-flops FF6 through FF9. In this manner, prior to the first pulse being counted by binary counter BC3, the counter is in its reset condition, with each 1 terminal having a binary 0 output and each 0 terminal having a binary 1 output. Accordingly, at that point in time each of the four inputs to NOR-gate 200 has a binary 0 signal and, hence, the output of NOR-gate 200 carries a binary 1 signal. NOR-gate 201 is connected to the binary counter BC3 so that when the binary counter has counted the first pulse a match is obtained to provide a binary 1 signal output. Gates 202 through 212 are oriented in a similar manner so that the gates sequentially carry binary 1 signals at their output circuits in accordance with the count noted by binary counter BC3. This aspect will become more apparent from the description of operation that follows hereinafter with respect to the RECEIVER LOGIC TRUTH TABLE II.

With reference to FIG. 4, it will be noted that the various outputs of sequencer SQ are coupled to the signal-processing circuitry SP as well as to the memory circuitry M. These outputs of sequencer SQ are obtained by means of logic circuitry connected to NOR-gates 200 through 212. Thus, the output circuit of NOR-gate 200 is coupled through an amplifier 213, an inverter amplifier 217, and two additional inverter amplifiers 217 and 219 to a terminal RD-OUT. Also, the output of inverter amplifier 215 is coupled through a NOR-gate 221 and thence through an inverter amplifier 223 to a terminal R-IN. The output of inverter amplifier 223 is also connected to differentiator DIFF-2 through an inverter amplifier 162 in FIG. 6. Similarly, the output of amplifier 213 is connected to the 30 -millisecond timer T as well as to inverter amplifier 146 in FIG. 5.

The output of NOR-gate 201 is coupled through an inverter amplifier 225 and thence through a NOR-gate 227 and an inverter amplifier 230 to terminal RD-IN. NOR-gates 221 and 227 each have a second input connected in common and thence through an inverter amplifier 232 extending from the output of timer T in the initiator circuit IC of FIG. 5. The output of inverter amplifier 226 is coupled through an inverter amplifier 234 and thence through a NOR-gate 236 and an inverter amplifier 238 to the timer T in the initiator circuit IC.

The output of NOR-gate 202 is coupled through a diode 240 and thence through an inverter amplifier 242 to a terminal S-OUT. The output of NOR-gate 203 is connected through a diode 244 and thence through an inverter amplifier 246 to the NOR-gate 236. The output of inverter amplifier 246 is also coupled through a NOR-gate 248 and thence to a terminal START. One input to NOR-gate 248 is obtained through an inverter amplifier 250 extending from the output of timer T in FIG. 7. The output of inverter amplifier 250 as well as the output of NOR-gate 236 are coupled through a NOR-gate 252 having its output coupled through an inverter amplifier 254 to a terminal S-IN.

The output of NOR-gate 204 is coupled through a diode 256 and thence through a second diode 258 and an inverter amplifier 260 to terminal SD-OUT. The output of NOR-gate 204 is also connected through an inverter amplifier 262 and thence to a terminal M1.

The output of NOR-gate 205 is coupled through a diode 264 and thence to a terminal STOP.

The output of NOR-gate 206 is coupled through a diode 266 and thence through diode 258 and inverter amplifier 260 to terminal SD-OUT. Also, the output of NOR-gate 206 is coupled through an inverter amplifier 268 to terminal M2. The output of NOR-gate 207 is coupled through a diode 270 to a point which is common with diodes 244 and 264 to the terminal STOP. Similarly, the output of NOR-gate 209 is coupled through a diode 272 to the terminal STOP. Also, the output of NOR-gate 211 is coupled through a diode 274 to the terminal STOP.

The output of NOR-gate 208 is coupled through a diode 276 and thence through a diode 278 and the inverter amplifier 242 to the terminal S-OUT. The output of NOR-gate 208 is also coupled through an inverter amplifier 280 to the terminal M3.

The output of NOR-gate 210 is coupled through a diode 282 and thence through diode 278, and inverter amplifier 242 to the terminal S-OUT. Also, the output of NOR-gate 210 is coupled through an inverter amplifier 284 to terminal M4.

The output of NOR-gate 212 is coupled through an inverter amplifier 286 to terminal M4. Also, the output of NOR-gate 212 is coupled through an amplifier 288 and thence through a diode 290 and inverter amplifier 242 to the terminal S-OUT. The output side of amplifier 288 is also connected through an integrator circuit INT-1 from the cathode side of diode 198 in the binary counter BC3. This output of amplifier 288 is also coupled through an inverter amplifier 292 to the terminal R-OUT.

The output of inverter amplifier 246 is coupled to one input of NOR-gate 294 and thence through an inverter amplifier 296 to terminal SD-IN. A second input of NOR-gate 294 is obtained from the output of timer T in the initiator circuit IC of FIG. 5.

SIGNAL PROCESSING CIRCUITRY

The signal-processing circuitry SP is illustrated in FIG. 4. Briefly, circuitry SP includes four average hold circuits R, S, RD, SD, a subtractor circuit SB and an analog-to-BCD decoder AB. The construction of each average-and-hold circuit is the same and will be described in greater detail hereinafter the reference to the average-and-hold circuit R shown in FIG. 8. At this point, however, it should be noted that each average-and-hold circuit has an IN terminal and an OUT terminal. These are the terminals referred to in FIG. 7. Thus, terminal R-IN refers to the IN terminal of average-and-hold circuit R, and the terminal S-IN refers to the In terminal of average-and-hold circuit S. Similarly, the analog-to-BCD decoder has a STOP and START terminal. These are the two terminals referred to in FIG. 7. The average-and-hold circuits R and S are both coupled to the output of inverter buffer amplifier IBA. The outputs of average-and-hold circuits R and S are applied to subtractor SB. The outputs of subtractor SB, in turn, are applied to average-and-hold circuits RD and SD. Also, the outputs of average-and-hold circuits RD and SD are applied to the analog-to-BCD decoder AB. The output of decoder AB is applied to a memory circuit M and thence through a binary coded decimal to decimal decoder BCD to a decimal readout DR. Circuits M, BCD and DR will be described in greater detail hereinafter with reference to FIGS. 11 and 12.

AVERAGE AND HOLD CIRCUITS

Each of the average-and-hold circuits R, S, RD and SD, shown in FIG. 4, takes the form as shown in FIG. 8 with reference to circuit R. As shown, circuit R includes seven field effect transistors F1 through F7. Field effect transistors F1, F3, F5 and F6 are P-channel field effect transistors, whereas field effect transistors F2, F4 and F7 are N-channel field effect transistors. THe gate of transistor F3 is connected to the IN terminal as well as through a resistor 300 to the B+ power supply source. A resistor 302 connects the B− voltage supply to one side of transistor F3 and thence to the gate of transistor F2. The gate transistor F1 is connected through a resistor 304 to the other side of transistor F3. Transistor F3 serves as a gate for transistors F1 and F2. Transistors F1 and F2 serve as an input or "set" pair of field effect transistor gates. Although the transistors are symmetrical, inasmuch as their drain and source terminals are interchangeable, the input sides of transistors F1 and F2 are connected in common to the inverter buffer amplifier IBA of circuitry CF and serve as the drains since the other sides of the parallelly connected transistors are connected to ground through circuits that are electrically isolated. Capacitor 306 serves as a holding capacitor to hold a charge proportional to an applied input voltage. Resistor 308, which couples transistors F1 and F2 to the capacitor 306, serves in conjunction with the capacitor to raise the charging time constant to prevent integrating or averaging of sharp noise spikes. A pair of oppositely poled diodes 310 and 312, poled as shown, are connected in parallel with capacitor 306. Also, the field effect transistor F4 has its source-to-drain circuit connected in parallel with capacitor 306. The gate of transistor F4 is connected to one side of field effect transistor F5 as well as through a resistor 314 to the B− voltage supply source. The other side of field effect transistor F5 is connected to ground. .The gate of field effect transistor F5 is connected both to the OUT terminal as well as through a resistor 316 to the B+ voltage supply source. Field effect transistor F4 serves as a "clear" transistor for discharging capacitor 306 when field effect transistor F5 is gated on by the sequencer circuit SQ, as will be described in greater detail hereinafter. Field effect transistor F4 is coupled to the common connected gates of field effect transistors F6 and F7 which are connected as source followers. Thus, one side of each of the field effect transistors F6 and F7 is connected to a potentiometer 318 having its wiper arm connected to the base of an NPN-transistor 320. The other side of field effect transistor F7 is connected to the B+voltage supply source, whereas the other side of field effect transistor F6 is connected through a resistor 322 to the B− voltage supply source. The collector of transistor 320 is connected to the B+ voltage supply source, whereas the emitter is connected through a resistor 324 to the B− voltage supply source. THe output of the average-and-hold circuit R is taken from the emitter of transistor 320.

In the operation of the average-and-hold circuit R, field effect transistor F3 serves to gate transistors F1 and F2. Transistor F3 is gated into conduction upon receipt of a binary 0 signal, at input terminal IN from the sequencer SQ. As transistor F3 is gated into conduction, the P-channel transistor F1 will receive a potential on the order of 3 volts, whereas the N-channel transistor F2 will receive a potential of about zero volts. Accordingly, for small input voltages received from the clock-forming circuitry CF, both transistors will conduct. For large positive signals, however, only the N-channel transistor F2 will conduct with the degree of conduction lessening as the common source voltage increases with capacitor charge. The P-channel transistor F1 will then draw gate current limited by the values of the resistors and the gating circuits of transistor F3. The converse occurs for negative signals. The time during which the capacitor 306 is charged is determined by the sequencer SQ which gates the switching field effect transistor F3 on and off. The output or clear field effect transistor F4 discharges capacitor 306 when field effect transistor F5 is gated into conduction by the sequencer SQ. Only transistor F5 is needed to discharge capacitor 306, whatever the polarity of its discharge, since the drain-and-source sides are interchangeable. P- and N-channel field effect transistors F7 and F6, respectively, serve as source followers. The voltage at the potentiometer 318 is set for substantially a 0 potential when the input gates are set to ground. Resistor 308 is chosen to balance out the differences in current capability of the N- and P-channel field effect transistors. The output follower transistor 320 serves to prevent loading of field effect transistors F6 and F7 while permitting low impedance output. In summation, wherever the input terminal IN of average-and-hold circuit R receives a signal from the sequencer SQ, it actuates field effect transistors F1 and/or F2 to permit the voltage from the inverter buffer amplifier IBA to be stored by capacitor 306, and applied through the source follower transistor F6 and F7, and through the emitter follower transistor 320 to the load resistor 324. Thereafter, when the sequencer SQ applies a binary 0 signal to the OUT terminal, the capacitor 306 is discharged to clear the intelligence prior to the receipt of a second signal to be processed.

ANALOG-TO-BCD DECODER

Figure 9:
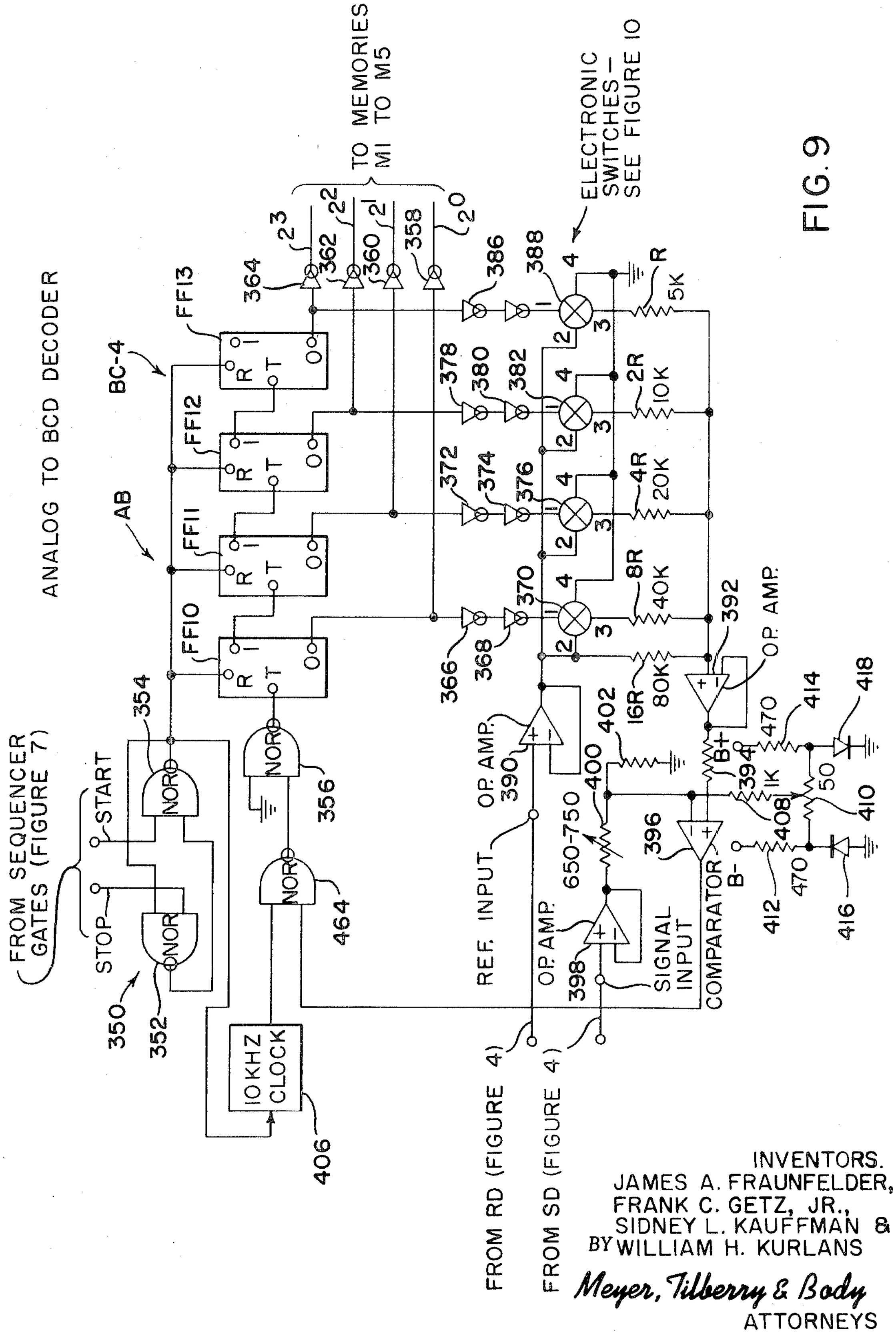
FIG. 9 is a combined schematic block diagram illustration showing the analog-to-BCD decoder of FIG. 4 in greater detail.

The analog-to-BCD decoder AB in the signal-processing circuitry SP is best illustrated in FIG. 9. As shown there, the decoder includes two control terminals STOP and START which are connected to the sequencer SQ (see FIG. 7). Input signals for the decoder are received from reference difference average-and-hold circuit RD as well as from the signal difference average-and-hold-circuit SD of FIG. 4. Decoder AB includes a flip-flop or bistable multivibrator circuit 350 comprised of a pair of NOR-gates 352 and 354 connected together to define a bistable multivibrator circuit. The STOP and START terminals are respectively connected to inputs of NOR-gates 352 and 354. The output of NOR-gate 354 is connected to reset terminal R of each of four flip-flops FF10, FF11, FF12 and FF13, which constitute a binary counter BC4. Each of the flip-flops FF10 through FF13 of the binary counter BC4 may take the form as discussed hereinbefore with reference to binary counters BC1 and BC2. Thus, the 1 terminal of each flip-flop is connected to the trigger terminal T of the next succeeding flip-flop. The trigger terminal T of the first flip-flop FF10 is connected to the output side of a NOR-gate 356. The 0 terminals of flip-flops FF10 through FF13 are respectively coupled through inverter amplifiers 358, 360, 362 and 364 to memory circuits M1 through M5, to be described in greater detail hereinafter with reference to FIGS. 11 and 12. The 0 terminal of flip-flop FF10 is also connected through a pair of series-connected inverter amplifiers 366 and 368 to an electronic switch 370. Similarly, the 0 terminal of flip-flop FF11 is connected through a pair of series-connected inverter amplifiers 372 and 374 to an electronic switch 376. Also, the 0 terminal of flip-flop FF12 is connected through a pair of series-connected inverter amplifiers 378 and 380 to an electronic switch 382. The 0 terminal of flip-flop FF13 is connected through a pair of series-connected inverter amplifiers 384 and 386 to an electronic switch 388. Each of the electronic switches 370, 376, 382 and 388 may take the form as shown in detail in FIG. 10, to be described in greater detail hereinafter. For the moment, each of these electronic switches have terminals marked 1, 2, 3 and 4, with terminals 1 being connected to the inverter amplifiers 368 and 386. Terminals 4 of the electronic switches are connected in common to ground and terminals 2 are connected in common to the output of an operational amplifier 390. Terminals 3 of electronic switches 370, 376, 382 and 388 are respectively connected through resistors 8R, 4R, 2R and R to the positive input of an operational amplifier 392. In addition, terminal 2 of electronic switch 370 is connected through a reference resistor 16R to the positive input of operational amplifier 392. Resistors R, 2R, 4R, 8R and 16R are respective of increasing values in the order indicated and, for example, may take the values of 5 kilohms, 10 kiolhms, 20 kilohms, 40 kilohms, and 80 kilohms, respectively. The output of operational amplifier 392 is coupled through a resistor 394 to the positive input of a comparator amplifier 396. Comparator amplifier 396 may take any suitable form, such as, for example, a differential amplifier. The negative input of amplifier 396 is taken from the output of an operational amplifier 398 through a variable resistor 400. A resistor 402 is connected between ground and the junction of resistor 400 and comparator 396. The output of comparator amplifier 396 is coupled to the input of a NOR-gate 404, which, in turn, has its output connected to the input of NOR-gate 356. The output of NOR-gate 354 in the bistable multivibrator 350 is coupled to an input of an astable multivibrator clock source 406, which, in turn, has its output coupled to one of the inputs of NOR-gate 404. The junction between the positive input of comparator amplifier 396 and resistor 394 is coupled through a resistor 408 and thence to the wiper arm of a potentiometer 410. Potentiometer 410 has its resistance portion connected between the B− and B+ voltage supply sources, through resistors 412 and 414, respectively. Also, opposing ends of the resistance portion of potentiometer 410 are coupled through diodes 416 and 418, poled as shown, to ground.

ELECTRONIC SWITCH

Figure 10:
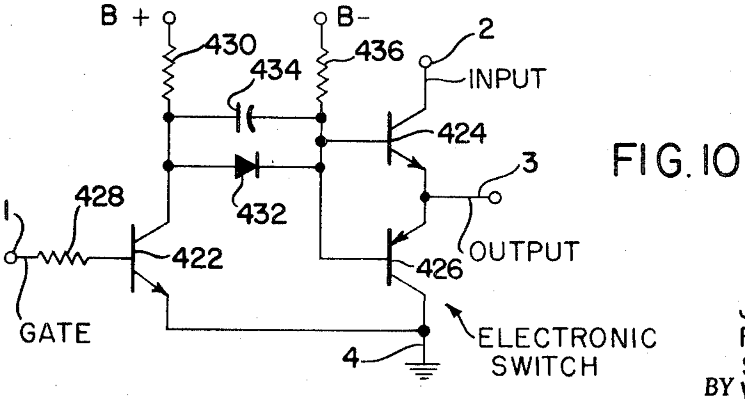
FIG. 10 is a schematic illustration of an electronic switch shown in block diagram in FIG. 9.

Each of the electronic switches 370, 376, 382 and 388, shown in FIG. 9, takes the form as shown in FIG. 10. As shown there, the four terminals 1, 2, 3 and 4 correspond with terminals 1, 2, 3 and 4 shown in conjunction with each of the electronic switches of FIG. 9. The electronic switch includes NPN-transistors 422 and 424 and a PNP-transistor 426. Transistor 422 has its emitter connected to the collector of transistor 424 and thence to ground. The base of transistor 422 is connected through a resistor 428 to terminal 1. The collector of transistor 422 is connected through a resistor 430 to the B+ voltage supply source. A diode 432, poled as shown, connects the collector of transistor 422 with the base of transistor 426. A capacitor 434 is connected in parallel with diode 432. The emitters of transistors 424 and 426 are connected together in common and thence to the output terminal 3. Transistor 424 has its collector connected to the input terminal 2 and its base connected in common with the base of transistor 426 as well as through a resistor 436 to the B− voltage supply source.

In operation, when a positive signal is applied to terminal 1, transistor 422 is biased into conduction at a saturation level so that its collector potential is substantially that of ground. This forward biases transistor 426 into conduction so that terminal 3 is effectively connected to terminal 4. However, when 0 volts is applied to terminal 1, transistor 422 is reversed biased so that a positive potential is applied through diode 432 to the bases of both transistors 424 and 426. This forward biases transistor 424 into conduction and reverse biases transistor 426. Accordingly, this effectively connects terminal 2 to terminal 3. Resistors 430 and 436 serve as biasing resistors and capacitor 434 permits rapid switching operation.

MEMORY DECODER AND READOUT CIRCUITS

Figure 11:
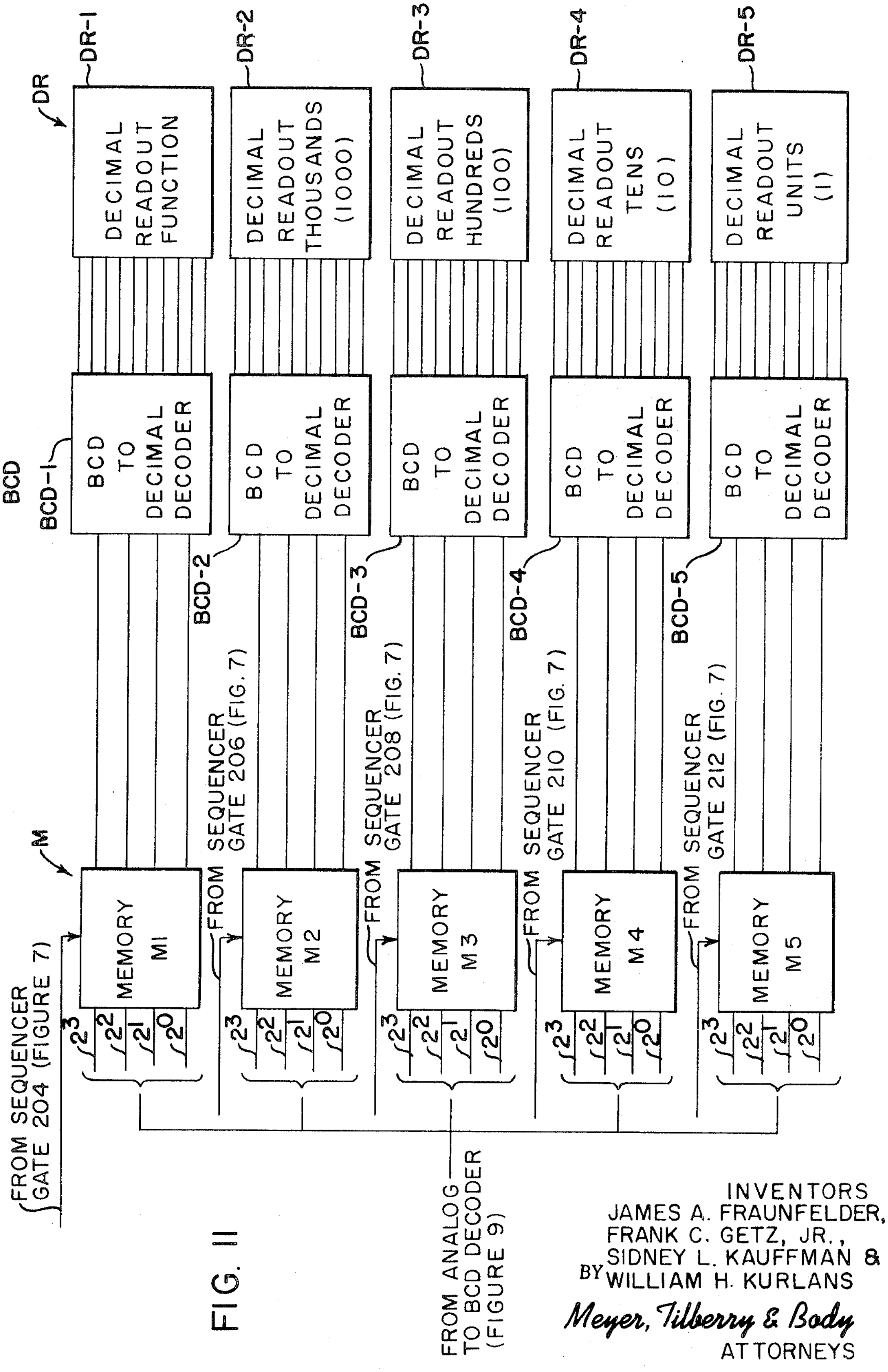
FIG. 11 is an amplified block diagram of the memory circuitry, BCD-to-decimal decoder, and decimal readouts shown in FIG. 4.

Reference is now made to FIG. 11 wherein the memory M, decoder BCD and readout circuit DR are shown in detail. Memory circuit M includes five memories M1, M2, M3, M4 and M5. Similarly, the BCD decoder circuit includes five decoders BCD1, BCD2, BCD3, BCD4 and BCD5. Similarly, the decimal readout circuit includes five decimal readouts DR1, DR2, DR3, DR4 and DR5 respectively representative of the function, thousands, hundreds, tens and units of the information received from the transmitter. Each of the memories M1 through M5 has an input taken from the sequencer SQ as well as four inputs taken from the output of the analog-to-BCD decoder AB. These four inputs from the decoder may be referred to as inputs $2^3$, $2^2$, $2^1$ and $2^0$, which are respectively taken from flip-flops FF13, FF12, FF11 and FF10. As is well known to those skilled in the art, the four outputs from the binary counter BC4 provide a pattern of output signals in binary coded decimal form. Thus, the decimal weight of the four outputs is 1, 2, 4 and 8 preceding from flip-flop FF10 to FF13. The sum of the weighted binary content of these four outputs is representative of a decimal number. Memory M1 also has an input taken from sequencer NOR-gate 204 of FIG. 7. Similarly, an input to memory M2 is taken from the sequencer NOR-gate 206. The input for the memory M3 is taken from sequencer NOR-gate 208 whereas the input for the memory M4 is taken from sequencer NOR-gate 210. Lastly, the input for the memory M5 is taken from the sequencer NOR-gate 212. Each of the memories M1 through M5 has four outputs coupled to the BCD to decimal decoders BCD1 through BCD5, respectively. These decoders, in turn, each have 10 outputs respectively coupled to the decimal readouts DR1 through DR5, respectively. Whereas the BCD-to-decimal decoders are shown as four-line to 10-line decoders they may, for example, also take the form of four-line to seven-line BCD decoders, with each decimal readout taking the form of a seven-element FIG. 8 readout.

Figure 12:
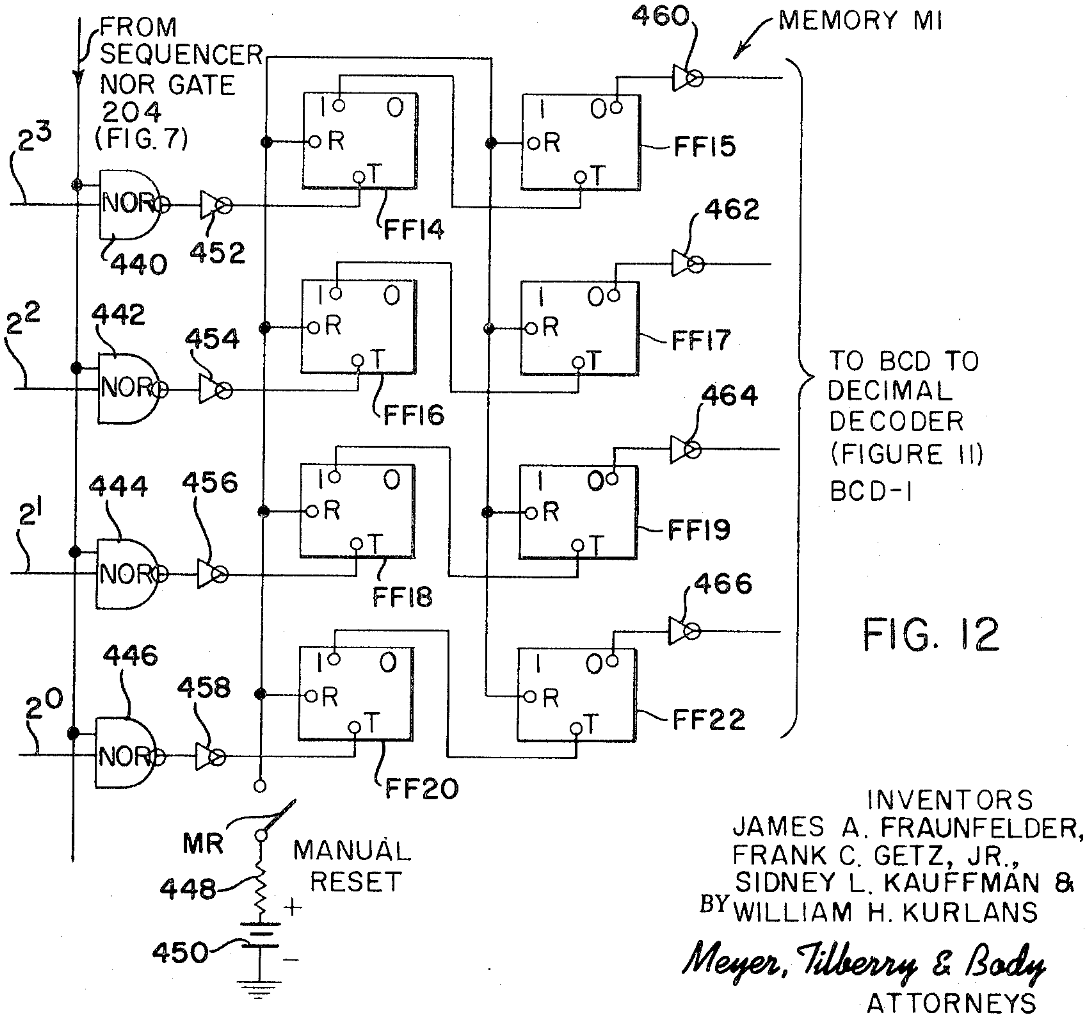
FIG. 12 is an amplified block diagram of one of the memories shown in FIG. 11; and, FIG. 13 is a graph showing various waveforms illustrating the operation of the receiver shown in FIGS. 4 through 12.

Each of the memories M1 through M5 takes the form as shown in FIG. 12 with reference to memory M1. As shown there, memory M1 has four inputs $2^0$, $2^1$, $2^2$ and $2^3$. The input from NOR-gate 204 is connected to one input each of NOR-gates 440, 442, 444 and 446. The four inputs $2^0$, $2^1$, $2^2$ and $2^3$ are respectively coupled to one input each of NOR-gates 446, 444, 442 and 440, respectively. In addition, memory M1 includes four pairs of flip-flops FF14, FF15; FF16, FF17; FF18, FF19; and, FF20, FF22. Each of the flip-flops FF14 through FF22 is constructed as discussed hereinbefore with reference to the flip-flops in the binary counters BC1 and BC2. The reset terminals R of these flip-flops are connected together in common through a manual reset switch MR and thence through a resistor 448 and a battery 450 to ground. The 1 terminal of flip-flop FF14 is connected to the trigger terminal T of flip-flop FF15. A similar connection is made between the remaining pairs of flip-flops. The trigger terminal T of flip-flop FF14 is coupled through an inverter amplifier 452 to the output of NOR-gate 440. Similarly, terminals T of flip-flops FF16, FF18 and FF20 are respectively connected to the outputs of NOR-gates 442 to 446, through inverter amplifiers 454, 456 and 458. The 0 terminals of flip-flops FF15, FF17, FF19 and FF22 are connected to the binary-to-decimal decoder BCD1 through inverter amplifiers 460, 462, 464 and 466, respectively.

RECEIVER OPERATION

The operation of the receiver circuitry is initiated when the squelch output of receiver FM decreases from substantially 9 volts (without signal) to 0 volts. This is inverted by the inverter amplifier IA whose positive output voltage is clamped to 3.3 volts by the Zener diode 120 in the clamp circuit CL (see FIG. 5). This may be referred to as a binary 1 signal. When no signal is received the squelch output voltage is at a level of around 9 volts and output provided by the clamp circuit CL is on the order of 0.5 volts, which is used hereinafter in the initiator circuitry as being a binary 0 signal. The output of the clamp circuit CL provides two functions. The first function is that when no signal is received, a binary 0 signal is obtained at the clamp circuit. This is converted to a binary 1 signal by the inverter amplifier 142 and applied to the reset line to reset all flip-flops in binary counter BC3, the 30-millisecond timer T in circuit IC and through inverter amplifier 144 to reset the system initiator flip-flop SI. When a transmitter signal is received, the output of the clamp circuit CL is a binary 1 signal and, hence, reset is removed. The second function provided by clamp circuit CL is that, upon receipt of a transmitter signal, it provides a binary 1 signal for initiating operation of the signal verification timer SVT.

Upon receipt of a transmitter signal, and with the flip-flops in the binary counter BC3 being reset, a binary 1 signal is provided by NOR-gate 200 (see FIG. 7). 7). This is inverted by inverter amplifier 146 in the initiator circuitry IC to provide a binary 0 signal to the input of NOR-gate 124. Also, the binary 1 signal provided by clamp CL is inverted by inverter amplifier 122 and applied as a binary 0 signal to NOR-circuit 124. Accordingly, the output of NOR-gate 124 is a binary 1 signal. This signal is then inverted by inverter amplifier 126 to provide a binary 0 signal for actuating the 10-millisecond signal verification timer SVT. After the 10 milliseconds has been timed out, the timer SVT provides a trigger signal to set the circuit initiator flip-flop SI. This flip-flop, in turn, provides a trigger signal for actuating the 30-millisecond timer T, providing a transmitter signal is still received by antenna A–2. If the signal has been lost, a reset signal would have appeared to prevent actuation of the 30-millisecond timer T. Accordingly, this circuit serves as a false actuation detection circuit.

When the 30-millisecond timer T is activated, it provides a positive square wave which turns on the input gate IN of the average-and-hold circuit R. This follows, since the positive signal obtained from timer T is applied in FIG. 7 through inverter amplifier 232 and thence as one input to NOR-gate 221. However, at this point in the circuit, the output of NOR-gate 200 is a binary 1 signal and this is inverted by inverter amplifier 215 so that a match is obtained at NOR-gate 221. The binary 1 signal output of NOR-gate 221 is converted into a binary 0 signal by inverter amplifier 223. With reference to FIG. 8, as well as to the description hereinbefore with respect to the average and hold circuit R, it will be appreciated that when a binary 0 signal is applied to terminal R–IN of the average-and-hold circuit R, the field effect transistor F3 is biased into conduction. Accordingly, the first voltage level $V_{R1}$ (see FIG. 13) which corresponds with the reference frequency level is applied to the average-and-hold circuit for storage in capacitor 306.

Figure 13:
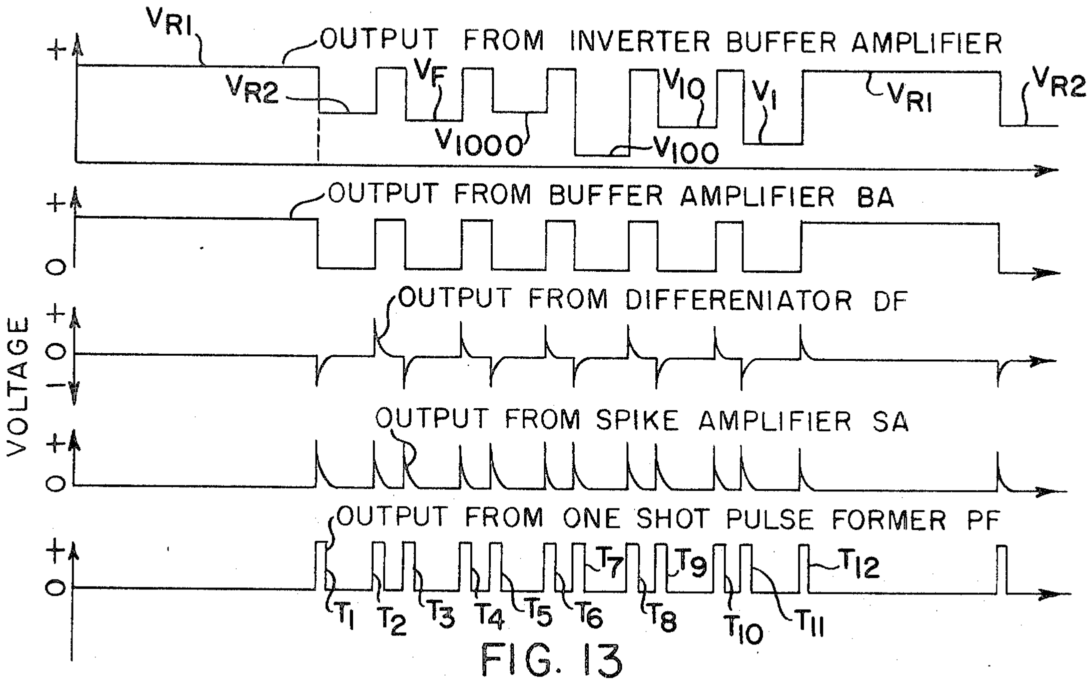

In operation of the receiver, a train of frequency pulses, as shown in the lower half of FIG. 3, is received by antenna A–2. This train of frequency pulses is converted into voltage levels at the discriminator output of receiver FM. These voltage levels are then inverted by the inverter buffer amplifier IBA in the clock-forming circuitry CF. The output of the inverter buffer amplifier is shown in the top portion of FIG. 13. As shown there, the value of the reference frequency signal FR1 is depicted as the largest voltage $V_{R1}$. The second reference signal pulse FR2 is shown as voltage level $V_{R2}$ which has a value on the order of one-half that of the $V_{R1}$. The remaining pulses Ff, $F_{1,000}$, $F_{100}$, $F_{10}$ and $F_1$ are shown in FIG. 13 as being of voltage levels VF, $V_{1,000}$, $V_{100}$ and $V_1$, which are of the values between zero and that of voltage level $V_{R2}$. The output of the inverter buffer amplifier IBA is applied through the buffer amplifier BA which serves to provide a pulsed square wave output of substantially 40-millisecond duration and of a value on the order of 10 volts each time the voltage from the inverter buffer amplifier increases in a positive direction. This train of voltage pulses is shown in FIG. 13.

The output of buffer amplifier BA is amplified by the voltage amplifier VA and applied to the signal switch SS. The signal switch circuit SS serves to prevent nonsignal components from erroneously activating the clock circuitry. Should the input to this circuit be below 2 volts (the usual nonsignal condition except for noise), the nonsignal path operates in the following manner. Zener diode 178 prevents transistor 174 from being forward biased into conduction. Thus, the collector of transistor 174 is essentially at B+ potential. This potential charges capacitor 166 until the level of the voltage stored reaches the peak point voltage of the unijunction transistor 168. At such time, the capacitor will discharge through the emitter the base B1 of the unijunction transistor to develop an output voltage across resistor 172. So long as transistor 174 is not biased into conduction, this process will continue to provide a train of pulses across resistor 172 at a frequency rate of 5 kilocycles per second. The output pulses appearing across resistor 172 bias transistor 184 into conduction at a frequency corresponding with that of the relaxation oscillator. The voltage divider consisting of resistors 186 and 188 normally provides a bias of about 5.5 volts through the blocking diode 190 to the input of unijunction transistor 192. This unijunction transistor, however, is biased for break down at about 8 volts. If the input voltage to the Zener diode 178 is above 2 volts, transistor 174 is biased into conduction, thereby short-circuiting capacitor 166 and disabling the unijunction relaxation oscillator circuit. Accordingly, since transistor 184 is not biased into conduction, its collector potential is increased sufficient to bias the input of the unijunction transistor at substantially 5.5 volts. When the transistor 184 is conducting, the collector potential of the transistor is substantially at 0 volts.

As the output voltage from the voltage amplifier VA goes above the break down voltage of about 8 volts for the unijunction transistor 192, the transistor is triggered into conduction through diode 191 in the direct signal path. Once biased into conduction, unijunction transistor 192 will remain in conduction due to the bias supplied by the collector potential of transistor 184. This condition remains until the output of the voltage amplifier VA drops below 2 volts, whereupon transistor 174 is reversed biased permitting the relaxation oscillator to operate. Thus, as soon as transistor 184 is biased into conduction by the output of the unijunction relaxation oscillator circuit, it serves to reverse bias unijunction transistor 192. Diode 191 in the signal path is used to prevent the output of transistor 198 from being fed back to the Zener diode 178, and thereby causing oscillation. The signal switch serves to prevent conduction of unijunction transistor 192 by a sharp edged low-voltage (less than 5.5 volts) spike pulse. The signal switch also maintains current flow for signal pulses when they trigger unijunction transistor 192. Also, the signal switch serves to reverse bias unijunction transistor 192 within a short period, such as on the order of 200 microseconds, after a signal pulse drops to less than 2 volts.

The output of the unijunction transistor 192 is a square wave having a negative going edge when each clock pulse is received and a positive going edge when it terminates. This signal is applied to the differentiator DF which provides a trigger pulse for each square wave edge. This waveform, as taken from the output of differentiator DF, is shown by the negative and positive spikes in FIG. 13. The output of the differentiator is then applied through a fullwave bridge rectifier for converting all spikes into positive spikes, and these are then amplified by a spike amplifier SA, the output waveform of which is shown in FIG. 13. This train of spike pulses is applied to the one-shot pulse former PF which provides a series of 1-millisecond wide square wave pulses T1 through T12 which, as shown in FIG. 13, correspond to each of the 12 voltage level changes per round in a transmitted message. Pulses T1 through T12 serve as the clock pulses for application to the binary counter BC3. Each of these positive pulses is inverted by inverter amplifier 152 and applied as a binary 0 signal to one input of NOR-gate 154. As discussed previously, once the initiator circuitry IC has confirmed that a transmitter signal has been received, it actuates the counter initiator flip-flop CI so that it provides through inverter amplifier 156 a binary 0 signal to the input of NOR-gate 154. Accordingly, each time that the one-shot pulse former PF provides a trigger pulse, the pulse is inverted by inverter 152 and applied as a binary 0 signal to the second input of NOR-gate 154. NOR-gate 154, in turn, applies a binary 1 signal to the trigger terminal T of the first flip-flop FF6 in the four-stage binary counter BC3 in sequencer SQ.

As discussed above, the binary counter BC3 receives, for each round of signals transmitted by the transmitter, a train of trigger pulses T1 through T12. Due to the manner of the logic interconnection of NOR-gates 200 and 212 with the output circuits of flip-flops FF6 through FF9, NOR-gates 201 through 212 sequentially provide binary 1 signals on their output circuits as trigger pulses T1 through T12 are counted. This operation may best be explained with reference to the RECEIVER LOGIC TRUTH TABLE II set forth below. This table presents a tabulation of the operation of flip-flops FF6 through FF9, Timer T, the IN and OUT gates of the average-and-hold circuits R, S, RD and SD, and the START gate of decoder AB.

RECEIVER LOGIC TRUTH TABLE II, PART I

| After pulse | Flip-flops (voltage) FF6 (side) 1 | FF6 (side) 0 | FF7 (side) 1 | FF7 (side) 0 | FF8 (side) 1 | FF8 (side) 0 | FF9 (side) 1 | FF9 (side) 0 | Timer T |
|---|---|---|---|---|---|---|---|---|---|
| 0− | 0 | 2 | 0 | 2 | 0 | 2 | 0 | 2 | OFF. |
| 0 | 0 | 2 | 0 | 2 | 0 | 2 | 0 | 2 | ON. |
| 0+30ms | 0 | 2 | 0 | 2 | 0 | 2 | 0 | 2 | OFF. |
| T1 | 2 | 0 | 0 | 2 | 0 | 2 | 0 | 2 | ON. |
| T1+30ms | 2 | 0 | 0 | 2 | 0 | 2 | 0 | 2 | OFF. |
| T2 | 0 | 2 | 2 | 0 | 0 | 2 | 0 | 2 | OFF. |
| T3 | 2 | 0 | 2 | 0 | 0 | 2 | 0 | 2 | ON. |
| T3+30ms | 2 | 0 | 2 | 0 | 0 | 2 | 0 | 2 | OFF. |
| T4 | 0 | 2 | 0 | 2 | 2 | 0 | 0 | 2 | OFF. |
| T5 | 2 | 0 | 0 | 2 | 2 | 0 | 0 | 2 | ON. |
| T5+30ms | 2 | 0 | 0 | 2 | 2 | 0 | 0 | 2 | OFF. |
| T6 | 0 | 2 | 2 | 0 | 2 | 0 | 0 | 2 | OFF. |
| T7 | 2 | 0 | 2 | 0 | 2 | 0 | 0 | 2 | ON. |
| T7+30ms | 2 | 0 | 2 | 0 | 2 | 0 | 0 | 2 | OFF. |
| T8 | 0 | 2 | 0 | 2 | 0 | 2 | 2 | 0 | OFF. |
| T9 | 2 | 0 | 0 | 2 | 0 | 2 | 2 | 0 | ON. |
| T9+30ms | 2 | 0 | 0 | 2 | 0 | 2 | 2 | 0 | OFF. |
| T10 | 0 | 2 | 2 | 0 | 0 | 2 | 2 | 0 | OFF. |
| T11 | 2 | 0 | 2 | 0 | 0 | 2 | 2 | 0 | ON. |
| T11+30ms | 2 | 0 | 2 | 0 | 0 | 2 | 2 | 0 | OFF. |
| T12(0) | 0 | 2 | 0 | 2 | 0 | 2 | 0 | 2 | ON. |

TABLE II (Continued), PART II

| After pulse | Gates R IN | R OUT | S IN | S OUT | RD IN | RD OUT | SD IN | SD OUT | Decoder start |
|---|---|---|---|---|---|---|---|---|---|
| 0− | OFF | OFF | OFF | OFF | OFF | ON | OFF | ON | OFF. |
| 0 | ON | OFF | OFF | OFF | OFF | ON | OFF | ON | OFF. |
| 0+30ms | OFF | OFF | OFF | OFF | OFF | ON | OFF | ON | OFF. |
| T1 | OFF | OFF | ON | OFF | ON | OFF | OFF | OFF | OFF. |
| T1+30ms | OFF | OFF | OFF | OFF | OFF | OFF | OFF | OFF | OFF. |
| T2 | OFF | OFF | OFF | ON | OFF | OFF | OFF | OFF | OFF. |
| T3 | OFF | OFF | ON | OFF | OFF | OFF | OFF | OFF | OFF. |
| T3+30ms | OFF | OFF | OFF | OFF | OFF | OFF | OFF | OFF | ON. |
| T4 | OFF | OFF | OFF | ON | OFF | OFF | OFF | ON | OFF. |
| T5 | OFF | OFF | ON | OFF | OFF | OFF | ON | OFF | OFF. |
| T5+30ms | OFF | OFF | OFF | OFF | OFF | OFF | OFF | OFF | ON. |
| T6 | OFF | OFF | OFF | ON | OFF | OFF | OFF | ON | OFF. |
| T7 | OFF | OFF | ON | OFF | OFF | OFF | ON | OFF | OFF. |
| T7+30ms | OFF | OFF | OFF | OFF | OFF | OFF | OFF | OFF | ON. |
| T8 | OFF | OFF | OFF | ON | OFF | OFF | OFF | ON | OFF. |
| T9 | OFF | OFF | ON | OFF | OFF | OFF | ON | OFF | OFF. |
| T9+30ms | OFF | OFF | OFF | OFF | OFF | OFF | OFF | OFF | ON. |
| T10 | OFF | OFF | OFF | ON | OFF | OFF | OFF | ON | OFF. |
| T11 | OFF | OFF | ON | OFF | OFF | OFF | ON | OFF | OFF. |
| T11+30ms | OFF | OFF | OFF | OFF | OFF | OFF | OFF | OFF | ON. |
| T12(0) | ON | OFF | OFF | OFF | OFF | ON | OFF | ON | OFF. |

The operation of the signal-processing circuitry SP may be best appreciated with reference to the RECEIVER LOGIC TRUTH TABLE II and the waveforms in FIG. 13. As shown in table II, various changes occur at flip-flops FF6 through FF9 in binary counter BC3 as well as to the 30-millisecond timer T, the IN and OUT gates of the four reference average hold circuits R, S, RD, SD and to the START gate of the analog-to-BCD decoder AB. Trigger pulse T1 through T12 are indicated in the table together with the corresponding functions that occur as a result of these signals. After pulse 0–, which refers to the point in time just prior to the receipt of a transmitter signal, flip-flops FF6, FF7, FF8 and FF9, respectively, each have a 0-volt level and a 2-volt level at their respective terminals 1 and 0. The 30-millisecond timer T1 is off and the only gates in the reference average-and-hold circuits that are on are the RD–OUT gate and the SD–OUT gate. Accordingly, the capacitors 306 in the reference difference average-and-hold circuit RD and in the signal difference average-and-hold circuit SD are completely discharged so that they may receive a signal pulse.

After pulse 0, which refers to the point in time that reset has terminated, flip-flops FF6 through FF9 remain unchanged; however, the 30-millisecond timer T has been turned on to time a period of 30 milliseconds. During this period of timing, the reference input gate R–IN is on so that the first reference voltage signal $V_{R1}$ is averaged and held in the reference average-and-hold circuit R. The reference difference out gate RD–OUT and the signal difference out gate SD–OUT are on to maintain capacitors 306 in those circuits discharged.

At time 0 plus 30 milliseconds when the timer T has completed its timing function, the flip-flops have not changed their stable state conditions and the reference difference and signal difference out gate RD–OUT and gate SD–OUT are still on to insure that capacitors 306 are discharged. After pulse T1 has bee counted, flip-flop FF6 changes its stable state from 0–2 to 2–0 (voltage levels), the 30-millisecond timer is on and the signal average-and-hold input gate S–IN is on so that voltage level $V_{R2}$ may be averaged and held in the signal average-and-hold circuit S. At this point in time, the reference difference input gate RD–IN is on and, hence, the subtractor SB subtracts voltage level $V_{R2}$ from voltage level $V_{R1}$ and places the difference voltage in the reference difference average-and-hold circuit RD.

30 milliseconds after trigger pulse T1, the 30-millisecond timer T is turned off, however, all of the flip-flops FF6 through FF9 remain in their last stable state (the stable state resulting from trigger pulse T1). As shown in TRUTH TABLE II all of the gates for the average-and-hold circuits are off.

Trigger pulse T2 changes the stable state of flip-flops FF6 and FF7 from their previous stable states, as shown in TRUTH TABLE II. 30-millisecond timer T is still off, and the signal average and hold gate S–OUT is turned on so that the capacitor 306 in that circuit becomes discharged or cleared.

Trigger pulse T3 changes the stable state of flip-flop FF6 to that as shown in the TRUTH TABLE II. At this point in time, the 30-millisecond timer T is turned on and gates S–IN and SD–IN are on. After 30 milliseconds, timer T is turned off and the decoder gate START is turned on. The reference difference signal, which is equal to the difference in voltage levels $V_{R1}$ and $V_{R2}$ is applied to operational amplifier 390 in the analog-to-CD decoder AB (see FIG. 9). Also, the signal difference, which is of a value in accordance with the difference between voltage $V_{R1}$ and $V_f$, is applied to the signal input of operational amplifier 398 in the analog-to-BCD decoder AB of FIG. 9. These difference voltages from the outputs of circuits RD and SD will now undergo a ratio comparison in the analog-to-BCD decoder AB. The output of decoder AB is a pattern of binary signals on outputs $2^0$, $2^1$, $2^2$, $2^3$ of the decoder AB and the sum of the binary content of these signals is representative of a decimal number. These signals are then applied through the memory circuit M to the BCD decoder BCD and thence to the decimal readout DR.

Referring back now to TRUTH TABLE II, the operation of the signal-processing circuitry continues as discussed above so that, for example, 30 milliseconds after trigger pulse T5, the reference difference output voltage applied to the analog-to-BCD decoder AB, is still of a value in accordance with the difference between voltage levels $V_{R1}$ and $V_{R2}$. However, the signal difference voltage is representative of the difference between voltage levels $V_{R1}$ and $V_{1,000}$. Again, these two difference voltages undergo a ratio comparison in the analog-to-BCD decoder AB and a pattern of output binary signals is obtained at outputs $2^0$, $2^1$, $2^2$ and $2^3$, representative of a decimal number.

In a similar manner, 30-milliseconds after pulse T7, the START gate of decoder AB, is turned on. The reference difference voltage applied to the analog BCD decoder AB is the same as that discussed above. However, the signal difference voltage applied to decoder AB will be the difference between voltage levels $V_{R1}$ and $V_{100}$. Again, these difference voltage signals undergo a ratio comparison in decoder AB and a binary coded decimal number in the form of a pattern of output binary signals is obtained at outputs $2^0$, $2^1$, $2^2$ and $2^3$, representative of a decimal number.

In a manner similar to that as discussed above, 30 milliseconds after trigger pulse T9, the START gate of decoder AB is turned on so that the decoder receives the voltage outputs from the reference difference average-and-hold circuit RD and the signal difference average-and-hold circuit SD. The reference difference voltage is the same as that discussed above. However, the signal difference output is representative of the difference in voltage levels $V_{R1}$ and $V_{10}$. Again these two difference voltage signals undergo a ratio comparison in decoder AB and a pattern of output binary signals is provided on the binary coded decimal outputs $2^0$, $2^1$, $2^2$ and $2^3$.

Lastly, 30 milliseconds after trigger pulse T11, the START gate of decoder AB is again turned on, so that decoder AB may receive the outputs from the reference difference average-and-hold circuit RD and the signal difference average-and-hold circuit SD. The reference difference output voltage is the same as that discussed above. However, the signal difference output voltage is representative of the difference between voltage levels $V_{R1}$ and $V_1$. Again, these two difference voltages undergo a ratio comparison in decoder AB and a pattern of output binary signals is provided at the binary coded decimal output $2^0$, $2^1$, $2^2$ and $2^3$.

The decoding process that takes place when the decoder START gate is turned on 30 milliseconds after each trigger pulse T3 or T5 or T7 or T9 or T11 is the same and, accordingly, the description which follows will be given only with reference to that which occurs 30 milliseconds after trigger pulse T3. The decoder AB is shown in detail in FIG. 9. It is to be appreciated, however, that various analog-to-BCD decoders may be used other than the one specifically shown in FIG. 9. In the stop or reset condition, all of the flip-flops FF10 through FF13 of the four-stage binary counter BC4 provide a 2-volt or binary 1 output signal at their 0 terminals. These signals are amplified by a two-stage inverter amplifier connected to the 0 terminal of each flip-flop and then applied to the electronic switches 370, 376, 382 and 388. As discussed previously with reference to FIG. 10, application of a positive signal to terminal 1 of each electronic switch effectively connects terminals 3 and 4 together. This places resistors R, 2R, 4R and 8R in parallel between the positive input of operational amplifier 392 and ground. These parallelly connected resistors form a voltage divider with resistor 16R such that 1/32 of the reference input to the operational amplifier 390 is applied to the positive input of comparator 396. The signal difference input, after being amplified by operational amplifier 398, is applied to the negative input of comparator 396. The operation of comparator 396 is such that whenever the value of the voltage at the positive input exceeds that at the negative input, the output of the comparator is a positive voltage; otherwise, the output of the comparator is at a 0-voltage level.

In the decoding operation, the ratio of the reference voltage input to the comparator 396 is increased in 1/16 voltage steps by gating the electronic switches 370, 376, 382 and 388 by means of the four-stage binary counter BC4. Upon receipt of a START signal, the stable state of multivibrator circuit 350 is changed, and the reset signal is removed from the reset line. In addition, the change in state of multivibrator circuit 350 serves to actuate astable multivibrator clock circuit 406 into operation to provide trigger pulses for the binary counter BC4. When the first pulse has been counted, the 0 terminal of flip-flop FF10 provides a binary 0 signal. This is amplified through the series-connected inverter amplifiers 366 and 368 and is applied as a binary 0 signal to terminal 1 of electronic switch 370. As discussed previously with reference to FIG. 10, a binary 0 signal applied to terminal 1 effectively connects terminals 2 and 3 together. Accordingly, resistors 8R and 16R are now connected together in parallel and these parallelly connected resistors are now in series with resistors 4R, 2R and R, such that 3/32 of the reference voltage input is applied to the positive input of comparator 396. If this input is less than that at the negative output of comparator 396, a 0-voltage signal is still present on the output of comparator 396. The next trigger pulse from clock 406 will trigger flip-flop FF10 to its original stable state, i.e., with the input of its 0 terminal being at 2 volts, and flip-flop FF11 will have a binary 0 signal at its 0 output terminal. This signal is applied to terminal 1 of electronic switch 376, whereupon terminals 2 and 3 are effectively connected together. Accordingly, resistor 16R is now connected in parallel with resistor 4R and these parallelly connected resistors are connected in series with resistors 8R, 2R and R, such that 5/32 of the input reference voltage is now applied to the positive input of comparator 396. This process continues until the voltage level at the positive input to comparator 396 is greater than that at the negative input, whereupon a binary 1 signal is applied to the input of NOR-gate 404 to effectively stop further operation of clock 406, since additional signals received from the clock will not provide binary 0 signals at the output of NOR-circuit 404 for triggering the binary counter BC4.

The pattern of output signals provided at the output terminals $2^0$, $2^1$, $2^2$ and $2^3$ of decoder AB, when further triggering operation of the counter has discontinued, is the binary coded decimal analog of the ratio of the signal difference to the reference difference. Outputs $2^0$, $2^1$, $2^2$ and $2^3$ have decimal weights of 1, 2, 4 and 8, respectively. Thus, if a binary 1 signal is present on output $2^3$ and a binary 1 signal is present at output $2^0$, this is representative of decimal number 9. Similarly, if a binary 1 signal is present on each of the outputs $2^2$ and $2^1$ this is representative of a decimal number 6. The decimal number is representative of the ratio of the signal difference voltage to the reference difference voltage. The 1/32 offset ratio voltage provides the proper truncation. Ten steps provides 20/32 plus 1/32 or 21/32 of the reference voltage. The input operational amplifiers are adjusted so as to make this value equal to the maximum signal (difference voltage input expected). The circuitry in the positive input of the comparator serves to reduce the differential amplifier offset voltage. DECODER LOGIC TRUTH TABLE III shows the remaining sequence of operation for pulses 2 through 10.

DECODER LOGIC TRUTH TABLE III

| | Flip-Flop (Voltage) | | | |
|---|---|---|---|---|
| | FF10 Side | FF11 Side | FF12 Side | FF13 Side |
| Reset | 0 2 | 0 2 | 0 2 | 0 2 |
| Pulses | | | | |
| 1 | 2 0 | 0 2 | 0 2 | 0 2 |
| 2 | 0 2 | 2 0 | 0 2 | 0 2 |
| 3 | 2 0 | 2 0 | 0 2 | 0 2 |
| 4 | 0 2 | 0 2 | 2 0 | 0 2 |
| 5 | 2 0 | 0 2 | 2 0 | 0 2 |
| 6 | 0 2 | 2 0 | 2 0 | 0 2 |
| 7 | 2 0 | 2 0 | 2 0 | 0 2 |
| 8 | 0 2 | 0 2 | 0 2 | 2 0 |
| 9 | 2 0 | 0 2 | 0 2 | 2 0 |
| 10 | 0 2 | 2 0 | 0 2 | 2 0 |

Part II

| | Circuit Conduction | |
|---|---|---|
| | 16R In Parallel With | 16R In Series With |
| Reset | | R, 2R, 4R, 8R |
| Pulses | | |
| 1 | 8R | 4R, 2R, R |
| 2 | 4R | 8R, 2R, R |
| 3 | 8R, 4R | 2R, R |
| 4 | 2R | R, 4R, 8R |
| 5 | 8R, 2R | R, 4R |
| 6 | 4R, 2R | R, 8R |
| 7 | 8R, 4R, 2R | R |
| 9 | 8R, R | 2R, 4R |
| 10 | 4R, R | 2R, 8R |

As will be recalled, the voltage level $V_F$ is an inverted representation of the function frequency pulse $F_F$ which was representative of decimal number 2. Accordingly, when the ratio is being determined with respect to the voltage $V_F$ the binary counter BC4 stopped its operation after two pulses were counted. The binary coded output $2^3$, $2^2$, $2^1$ and $2^0$ carried the binary signal 0–0–1–0 which is representative of decimal number 2. This input 9–0–1–0 is applied to memory M1. With reference now to FIG. 12, it is seen that inputs $2^3$, $2^2$, $2^1$ and $2^0$ carry input signals 0–0–1–0 for application to NOR-gates 440, 442, 444 and 446, respectively. The second input of each of these four NOR gates is taken from the output of NOR-gate 204 in FIG. 7. However, that NOR gate has its output coupled through inverter amplifier 262 before the signal is applied to NOR-gates 440, 442, 444 and 446. Accordingly, the second input to each of these NOR gates is a binary 0 signal. The outputs of NOR-gates 440, 442, 444 and 446 are respectively 1–1–a'–1. These outputs are again inverted by inverter amplifiers 452, 454, 456 and 458. Accordingly, the output of inverter amplifier 456 is a binary 1 signal which is required to trigger its associated flip-flop FF18. After reset, the 1 terminal of flip-flop of FF18 is 0 volts and the 0 terminal is at 2 volts. Upon receipt of a trigger signal from inverter amplifier 456, the stable state of flip-flop FF18 is changed so that the output at the 1 terminal is 2 volts and the output at the 0 terminal is 0 volts. No change is made at this time to the stable state of flip-flop FF19. After the next round of signals transmitted from the transmitter, the inputs to input terminals $2^3$, $2^2$, $2^1$, $2^0$ will again be 0–0–1–0. Thus, a second trigger signal is applied to the trigger terminal T of flip-flop FF18. This changes the stable state of flip-flop FF19 so that the voltage level at terminal 0 is now 0 volts. This is inverted by inverter amplifier 456 to provide a binary 1 signal at its output. Accordingly, the binary output signals on the output terminals of inverter amplifiers 460, 462, 464 and 466 are now 0–0–1–0 which is representative of the decimal number 2.

Referring now to FIG. 11, it is seen that the four outputs of memory M1 (FIG. 12) are applied to a binary coded decimal-to-decimal decoder BCD1. This decoder may take suitable forms, such as a diode matrix, and as shown in FIG. 11, includes 10 outputs. These 10 outputs may be representative of decimal numbers 0 through 9. If the binary input to the decoder BCD1 is 0–0–1–0, then one of these outputs energizes a readout lamp, representative of decimal number 2, in the decimal readout DR1. If desirable, in addition to the visual readout, a permanent record may be made by actuating a printer to print the numeral 2 on a sheet of paper. In a similar manner, readouts are obtained at decimal readouts DR–2, DR–3, DR–4, DR–5 so that the decimal number 2–0–8–3–5 is displayed which, as will be recalled, is the intelligence transmitter from the transmitter. The number 2 is representative of the message transmitted, such as fire or ambulance or tow truck, and the number 0–8–3–5 is representative of the address of the transmitter.

The invention has been described in connection with a particular preferred embodiment, but is not to be limited to same. Various modifications may be made without departing from the scope and spirit of the present invention as defined by the appended claims.

We claim: 30 milliseconds

1. A coded signal communication system including a plurality of transmitters for transmitting coded frequency signals and a receiver for receiving said signals, wherein:

each said transmitter includes:

means for generating at least one transmitter address frequency pulse and a message frequency pulse, wherein each said frequency pulse is of a frequency selected from one of 10 different frequencies of respectively increasing decimal weight representative of decimal numbers 0 to 9;

oscillator means for providing an oscillator frequency signal of a reference frequency;

frequency shift control means for selectively shifting the frequency of said oscillator frequency signal from said reference frequency to one of said different frequencies, said frequency shift control means includes a plurality of frequency-selecting actuatable switching means each for, upon actuation, selecting one of said different frequencies to be transmitted;

means for sequentially actuating said plurality of switching means so that said oscillator frequency signal includes a train of time-spaced frequency pulses with the frequency of each said frequency pulse being a selected one of said 10 different frequencies in accordance with which one of said switching means is actuated and that during the time space between adjacent frequency pulses the frequency of said oscillator frequency signal is that of said reference frequency; said sequential actuating means having a time base generating means for providing a train of trigger pulses, means for counting said pulses and having a plurality of outputs for carrying a pattern of output signals which changes in accordance with the pulse count, and a plurality of gating means each having an output for applying an actuating signal to an associated different one of said switching means, each said gating means having a plurality of inputs coupled to said counting means in such a manner that each said gating means provides a said actuating signal upon an associated predetermined count whereby said plurality of gating means sequentially actuate said plurality of switching means in accordance with the pulse count; and said receiver includes decoder means for decoding said frequency pulses and indicator means for providing output indications representative of said transmitter address and said message.

2. A coded signal communication system as set forth in claim 1, wherein each said gating means has an input coupled to said time base generating means so that said plurality of gating means sequentially provide said actuating signals in accordance with the frequency of said generated trigger pulses.

3. A coded signal communication system including a plurality of transmitters for transmitting coded frequency signals and a receiver for receiving said signals, wherein:

each said transmitter includes:

means for generating at least one transmitter address frequency pulse and a message frequency pulse, wherein each said frequency pulse is of a frequency selected from one of 10 different frequencies of respectively increasing decimal weight representative of decimal numbers 0 to 9;

oscillator means, including a crystal-controlled oscillator, for providing an oscillator frequency signal of a reference frequency;

frequency shift control means for selectively shifting the frequency of said oscillator frequency signal from said reference to one of said different frequencies, said frequency shift control means including: a plurality of frequency-selecting actuatable switching means each for, upon actuation, selecting one of said different frequencies to be transmitted; variable capacitance means coupled to the crystal of said oscillator for varying the oscillator output frequency, said capacitance means exhibiting the characteristic of having its capacitance vary in response to variations in the electrical potential applied thereto; a plurality of frequency-determining impedances; a direct current voltage source; and means for selectively connecting said impedances in series with said capacitance means across said source, whereby the oscillator output frequency is changed in value dependent on the selected impedance; and, said receiver includes decoder means for decoding said frequency pulses and indicator means for providing output indications representative of said transmitter address and said message.

4. A coded signal communication means including a plurality of transmitters for transmitting coded frequency signals and a receiver for receiving said signals, wherein:

each said transmitter includes:

means for generating at least one transmitter address frequency pulse and a message frequency pulse, wherein each said frequency pulse is of a frequency selected from one of 10 different frequencies of respectively increasing decimal weight representative of decimal numbers 0 to 0;

oscillator means, including a crystal-controlled oscillator, for providing an oscillator frequency signal of a reference frequency;

frequency shift control means for selectively shifting the frequency of said oscillator frequency signal from said reference frequency to one of said different frequencies, said frequency shift control means including: a plurality of frequency-selecting actuatable switching means each for, upon actuation, selecting one of said different frequencies to be transmitted; variable capacitance means coupled to the crystal of said oscillator for varying the oscillator output frequency, said capacitive means exhibiting the characteristic of having its capacitance vary in response to variations in the electrical potential applied thereto; a direct current voltage source; a reference frequency determining impedance connected in series with said capacitance means across said source so that the oscillator output frequency is normally determined by the value of said reference impedance; a like plurality of switching means each for, upon actuation, connecting an associated said frequency-determining impedance in parallel with said reference impedance to thereby change the oscillator output frequency; and means for sequentially actuating said plurality of switching means so that said oscillator output frequency includes a train of time-spaced frequency pulses with each pulse exhibiting a frequency in accordance with which one of said switching means is actuated and that during the time space between adjacent frequency pulses the oscillator output frequency is determined by said reference impedance; and said receiver includes decoder means for decoding said frequency pulses and indicator means for providing output indications representative of said transmitter address and said message.

5. A coded signal communication system including a plurality of transmitters for transmitting coded frequency signals and a receiver for receiving said signals, wherein:

each said transmitter includes:

circuit means for generating a reference frequency pulse, circuit means for generating a train of time-spaced frequency pulses representative of the location of the transmitter and at least one frequency pulse representative of a message wherein each said frequency pulse is of a frequency selected from at least two different frequencies;

frequency shift control means for selectively shifting the frequency of said transmitter frequency pulses from one to another of said different frequencies;

oscillator means for providing an oscillator frequency signal of a reference frequency;

a plurality of frequency-selecting actuatable switching means each for, upon actuation, selecting one of said different frequencies to be transmitted;

means for sequentially actuating said plurality of switching means to thereby generate said train of time-spaced frequency pulses with the frequency of each said frequency pulse being a selected one of said different frequencies in accordance with which one of said switching means is actuated and that during the time space between adjacent frequency pulses the frequency of said oscillator frequency signal is that of said reference frequency;

time base generating means for providing a train of trigger pulses;

means for counting said pulses, said counting means having a plurality of outputs for carrying a pattern of output signals which changes in accordance with the p ulse count;

a plurality of gating means each having an pulse applying an actuating signal to an associated different one of said switching means, each said gating means having a plurality of inputs coupled to said counting means in such a manner that each said gating means provides a said actuating signal upon an associated predetermined count whereby said plurality of gating means sequentially actuate said plurality of switching means in accordance with the pulse count; and said receiver includes decoder means for decoding said frequency pulses and indicator means for providing output indications representative of said transmitter address and said message.

6. A coded signal communication system as set forth in claim 5, wherein each said gating means has an input coupled to said time base generating means so that said plurality of gating means sequentially provide said actuating signals in accordance with the frequency of said generated trigger pulses.

7. A coded signal communication system including a plurality of transmitters for transmitting coded frequency signals and a receiver for receiving said signals, wherein:

each said transmitter includes:

circuit means for generating a reference frequency pulse, circuit means for generating a train of time-spaced frequency pulses representative of the location of the transmitter and at least one frequency pulse representative of a message wherein each said frequency pulse is of a frequency selected from at least two different frequencies;

frequency shift control means for selectively shifting the frequency of said transmitter frequency pulses from one to another of said different frequencies;

oscillator means for providing an oscillator frequency signal of a reference frequency;

a plurality of frequency-selecting actuatable switching means each for, upon actuation, selecting one of said different frequencies to be transmitted;

means for sequentially actuating said plurality of switching means to thereby generate said train of time-spaced frequency pulses with the frequency of each said frequency pulse being a selected one of said different frequencies in accordance with which one of said switching means is actuated and that during the time space between adjacent frequency pulses the frequency of said oscillator frequency signal is that of said reference frequency;

variable capacitance means coupled to the crystal of said oscillator for varying the oscillator output frequency, said capacitance means exhibiting the characteristic of having its capacitance vary in response to variations in the electrical potential applied thereto;

a plurality of frequency-determining impedances;

a direct current voltage source;

means for selectively connecting said impedances in series with said capacitance means across said source, whereby the oscillator output frequency is changed in value dependent on the selected impedance; and said receiver includes decoder means for decoding said frequency pulses and indicator means for providing output indications representative of said transmitter address and said message.

8. A coded signal communication means including a plurality of transmitters for transmitting coded frequency signals and a receiver for receiving said signals, wherein:

each said transmitter includes:

circuit means for generating a reference frequency pulse, circuit means for generating a train of time-spaced frequency pulses representative of the location of the transmitter and at least one frequency pulse representative of a message wherein each said frequency pulse is of a frequency selected from at least two different frequencies;

frequency shift control means for selectively shifting the frequency of said transmitter frequency pulses from one to another of said different frequencies;

oscillator means for providing an oscillator frequency signal of a reference frequency;

a plurality of frequency-selecting actuatable switching means each for, upon actuation, selecting one of said different frequencies to be transmitted;

means for sequentially actuating said plurality of switching means to thereby generate said train of time-spaced frequency pulses with the frequency of each said frequency pulse being a selected one of said different frequencies in accordance with which one of said switching means is actuated and that during the time space between adjacent frequency pulses the frequency of said oscillator frequency signal is that of said reference frequency;

variable capacitance means coupled to the crystal of said oscillator for varying the oscillator output frequency, said capacitive means exhibiting the characteristic of having its capacitance vary in response to variations in the electrical potential applied thereto;

a direct current voltage source;

a reference frequency determining impedance connected in series with said capacitance means across said source so that the oscillator output frequency is normally determined by the value of said reference impedance;

a plurality of frequency-determining impedances;

a like plurality of switching means each for, upon actuation, connecting an associated said frequency determining impedance in parallel with said reference impedance to thereby change the oscillator output frequency;

means for sequentially actuating said plurality of switching means so that said oscillator output frequency includes a train of time-spaced frequency pulses with each pulse exhibiting a frequency in accordance with which one of said switching means is actuated and that during the time space between adjacent frequency pulses the oscillator output frequency is determined by said reference impedance; and said receiver includes decoder means for decoding said frequency pulses and indicator means for providing output indications representative of said transmitter address and said message.

9. A coded signal communication system as set forth in claim 8 wherein said variable capacitance means is a Zener diode and said impedances are electrical resistances.

10. A coded signal communication system including a plurality of transmitters for transmitting coded frequency signals and a receiver for receiving said signals, wherein each said transmitter includes:

oscillator means for providing signal having a reference frequency, means for providing at least one transmitter address frequency signal and at least one message frequency signal, wherein each said frequency signal is comprised of at least one frequency pulse of a frequency selected from at least two different frequencies;

actuatable frequency shift control means for shifting the frequency of said oscillator signal to one of said different frequencies;

control circuit means for actuating said frequency shift control means;

a plurality of frequency-selecting actuatable switching means each for, upon actuation, selecting one of said different frequencies to be transmitted;

means for sequentially actuating said plurality of switching means to thereby generate a train of said frequency pulses with the frequency of each said frequency pulse being a selected one of said different frequencies in accordance with which one of said switching means is actuated and that during the time space between adjacent frequency pulses the frequency of said oscillator frequency signal is that of said reference frequency;

time base generating means for providing a train of trigger pulses;

means for counting said pulses, said counting means having a plurality of outputs for carrying a pattern of output signals which changes in accordance with the pulse count;

a plurality of gating means each having an output for applying an actuating signal to an associated different one of said switching means, each said gating means having a plurality of inputs coupled to said counting means in such a manner that each said gating means provides a said actuating signal upon an associated predetermined count whereby said plurality of gating means sequentially actuate said plurality of switching means in accordance with the pulse count; and said receiver includes decoder means for decoding said frequency pulses and indicator means for providing output indications representative of said transmitter address and said message.

11. A coded signal communication system as set forth in claim 10, wherein each said gating means has an input coupled to said time base generating means so that said plurality of gating means sequentially provide said actuating signals in accordance with the frequency of said generated trigger pulses.

12. A coded signal communication system including a plurality of transmitters for transmitting coded frequency signals and a receiver for receiving said signals, wherein each said transmitter includes:

oscillator means, including a crystal-controlled oscillator, for providing a signal having a reference frequency, means for providing at least one transmitter address frequency signal and at least one message frequency signal, wherein each said frequency signal is comprised of at least one frequency pulse of a frequency selected from at least two different frequencies;

actuatable frequency shift control means for shifting the frequency of said oscillator signal to one of said different frequencies;

control circuit means for actuating said frequency shift control means;

a plurality of frequency-selecting actuatable switching means each for, upon actuation, selecting one of said different frequencies to be transmitted;

means for sequentially actuating said plurality of switching means to thereby generate a train of said frequency pulses with the frequency of each said frequency pulse being a selected one of said different frequencies in accordance with which one of said switching means is actuated and that during the time space between adjacent frequency pulses the frequency of said oscillator frequency signal is that of said reference frequency;

variable capacitance means coupled to the crystal of said oscillator for varying the oscillator output frequency, said capacitance means exhibiting the characteristic of having its capacitance vary in response to variations in the electrical potential applied thereto;

a plurality of frequency-determining impedances;

a direct current voltage source;

means for selectively connecting said impedances in series with said capacitance means across said source, whereby the oscillator output frequency is changed in value dependent on the selected impedance; and said receiver includes decoder means for decoding said frequency pulses and indicator means for providing output indications representative of said transmitter address and said message.

13. A coded signal communication means including a plurality of transmitters for transmitting coded frequency signals and a receiver for receiving said signals, wherein each said transmitter includes:

oscillator means, including a crystal-controlled oscillator, for providing a signal having a reference frequency, means for providing at least one transmitter address frequency signal and at least one message frequency signal, wherein each said frequency signal is comprised of at least one frequency pulse of a frequency selected from at least two different frequencies;

actuatable frequency shift control means for shifting the frequency of said oscillator signal to one of said different frequencies;

control circuit means for actuating said frequency shift control means;

a plurality of frequency-selecting actuable switching means each for, upon actuation, selecting one of said different frequencies to be transmitted;

means for sequentially actuating said plurality of switching means to thereby generate a train of said frequency pulses with the frequency of each said frequency pulse being a selected one of said different frequencies in accordance with which one of said switching means is actuated and that during the time space between adjacent frequency pulses the frequency oscillator frequency signal is that of said reference frequency;

variable capacitance means coupled to the crystal of said oscillator for varying the oscillator output frequency, said capacitive means exhibiting the characteristic of having its capacitance vary in response to variation in the electrical potential applied thereto;

a direct current voltage source;

a reference frequency determining impedance connected in series with said capacitance means across said source so that the oscillator output frequency is normally determined by the value of said reference impedance;

a plurality of frequency-determining impedances and a like plurality of switching means each for, upon actuation, connecting an associated said frequency-determining impedance in parallel with said reference impedance to thereby change the oscillator output frequency;

means for sequentially actuating said like plurality of switching means so that said oscillator output frequency includes a train of time-spaced frequency pulses with each pulse exhibiting a frequency in accordance with which one of said switching means is actuated and that during the time space between adjacent frequency pulses the oscillator output frequency is determined by said reference impedance, and said receiver includes decoder means for decoding said frequency pulses and indicator means for providing output indications representative of said transmitter address and said message.

14. A coded signal communication system including a plurality of transmitters for transmitting radio frequency signals and a receiver for receiving said signals, wherein:

each said transmitter includes means for generating at least one transmitter address radio frequency signal and a message radio frequency signal, wherein each said radio frequency signal is of a frequency selected from one of a plurality of different frequencies coded to exhibit a characteristic representative of a specific intelligence with the intelligence for said address radio frequency signal being representative of the transmitter address and the intelligence for said message radio frequency signal being representative of a particular message, said means including frequency shift control means for sequentially shifting the frequency of said transmitter frequency pulses from one to another of said different frequencies until all frequencies have been actuated, a plurality of frequency-selecting actuatable switching means each for, upon actuation, selecting one of said different frequencies to be transmitted so that only said selected frequencies are transmitted, and said receiver including decoder means for decoding said radio frequencies signals and indicator means for providing output indications representative of said transmitter address and said message.

15. A coded signal communication system as set forth in claim 14 wherein each said transmitter includes means for adjustably changing the said characteristic of said at least one address radio frequency signal to represent a different one of said decimal numbers 0 to 9.

16. A coded signal communication system as set forth in claim 14 wherein each said transmitter also includes means for adjustably changing the said characteristic of said message radio frequency signal to represent a different one of said decimal numbers 0 to 9 so as to change the message.

17. A coded signal communication system as set forth in claim 14 wherein each said transmitter further includes:

means for automatically repeating the transmission of said at least one address radio frequency signal and said message radio frequency signal a predetermined number of times.

18. A coded signal communication system as set forth in claim 17, wherein said automatic transmission repeating means includes preset counting means for counting the number of said transmissions for limiting the number of said transmissions to a preset number.

19. A coded signal communication system as set forth in claim 18, wherein each said transmitter further includes:

means for energizing said transmitter to transmit said preset number of transmissions; and means controlled, at least in part, by said counting means for deenergizing said transmitter after it has transmitted said preset number of transmissions.

20. A coded signal communication system as set forth in claim 19, wherein each said transmitter further includes:

timing means for, upon energization of said transmitter, timing a predetermined period of time in excess of the time required for transmission of said preset number of transmissions for purposes of limiting the period of time that said transmitter is energized.

21. A coded signal communication system as set forth in claim 14, wherein each said transmitter includes a crystal-controlled oscillator for generating said radio frequency signals and frequency shift keying means for changing the output frequency of said oscillator so that the said characteristic of each said radio frequency signal is a frequency selected from one of 10 different frequencies of respectively increasing decimal weight representative of said decimal numbers 0 to 9.

* * * * *